United States Patent [19]
Hartung et al.

[11] Patent Number: 4,633,387
[45] Date of Patent: Dec. 30, 1986

[54] LOAD BALANCING IN A MULTIUNIT SYSTEM

[75] Inventors: Michael H. Hartung; Arthur H. Nolta; David G. Reed; Gerald E. Tayler, all of Tucson, Ariz.

[73] Assignee: International Business Machines Corporation, Armonk, N.Y.

[21] Appl. No.: 469,680

[22] Filed: Feb. 25, 1983

[51] Int. Cl.⁴ ............................................. G06F 15/00
[52] U.S. Cl. ..................................... 364/200; 364/300
[58] Field of Search ... 364/200 MS File, 900 MS File, 364/300

[56] References Cited

U.S. PATENT DOCUMENTS

| | | | |
|---|---|---|---|
| 3,665,404 | 5/1972 | Werner | 364/200 |
| 3,964,056 | 6/1976 | Charpentier et al. | 364/200 |
| 4,001,784 | 1/1977 | Bardotti | 364/200 |
| 4,080,649 | 3/1978 | Calle et al. | 364/200 |
| 4,099,235 | 7/1978 | Hoschler et al. | 364/200 |
| 4,183,083 | 1/1980 | Chatfield | 364/200 |
| 4,317,168 | 2/1982 | Messina et al. | 364/200 |
| 4,318,174 | 3/1982 | Suzuki et al. | 364/200 |
| 4,333,144 | 6/1982 | Whiteside et al. | 364/200 |
| 4,394,730 | 7/1983 | Suzuki et al. | 364/200 |
| 4,403,286 | 9/1983 | Fry et al. | 364/200 |
| 4,415,970 | 11/1983 | Swenson et al. | 364/200 |
| 4,458,316 | 7/1984 | Fry et al. | 364/200 |
| 4,467,411 | 8/1984 | Fry et al. | 364/200 |
| 4,481,583 | 11/1984 | Mueller | 364/200 |
| 4,491,909 | 1/1985 | Shimizn | 364/200 |
| 4,495,562 | 1/1985 | Yamaji et al. | 364/200 |
| 4,539,637 | 9/1985 | DeBruler | 364/200 |

Primary Examiner—James D. Thomas
Assistant Examiner—Thomas C. Lee
Attorney, Agent, or Firm—Herbert F. Somermeyer; James A. Pershon; George E. Clark

[57] ABSTRACT

In a multiunit data processing system, such as a multi-control unit peripheral data storage system, a least busy one of the units requests work to be done from a busier unit. The busier unit, a work sending unit, supplies work to the work requesting or least busy unit. Work thresholds in the respective units determine when work is to be requested or transferred. In a data storage environment, the transferred work consists of data transfers to be achieved usually asynchronously to connected host activities, such as data transfers between a backing and a front store in a data storage hierarchy.

8 Claims, 19 Drawing Figures

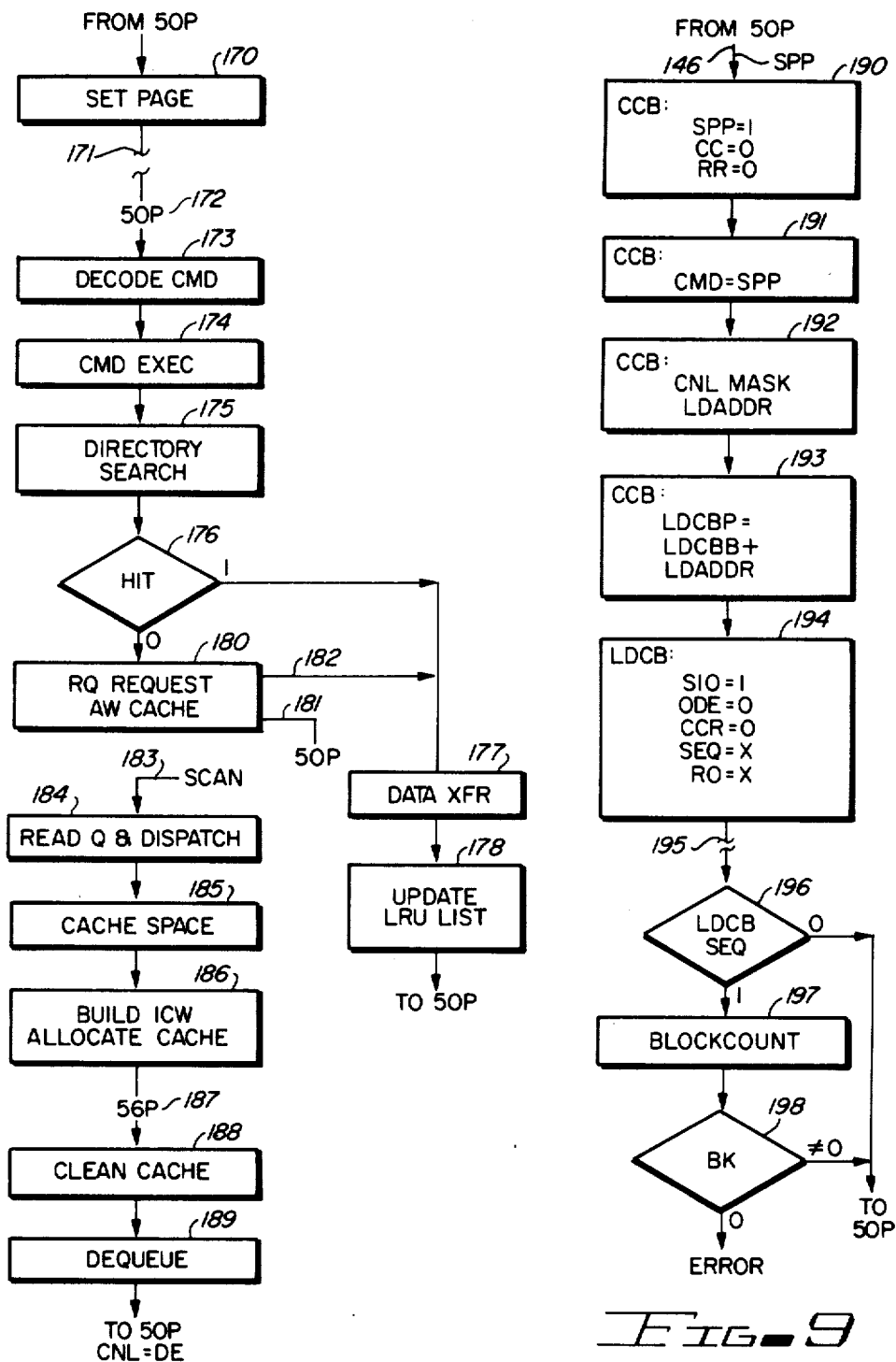

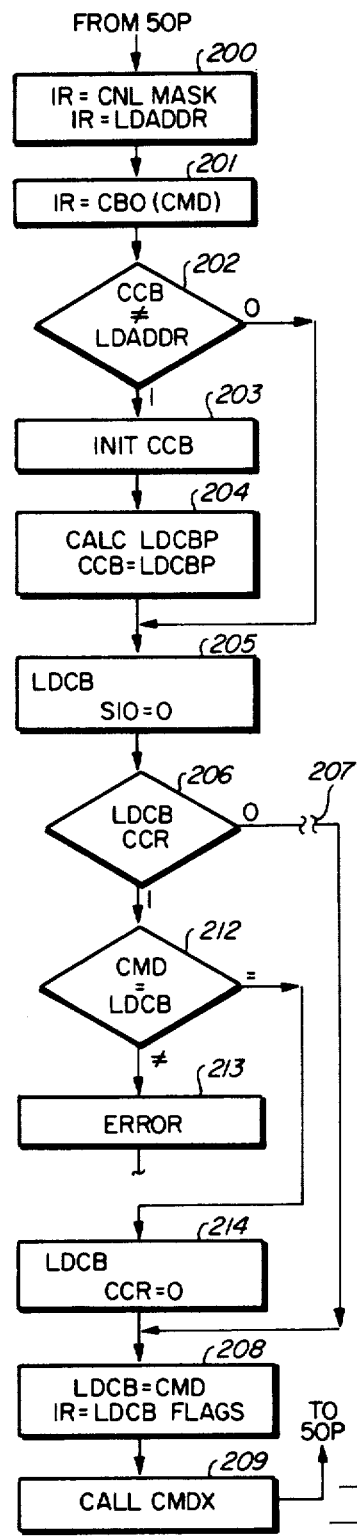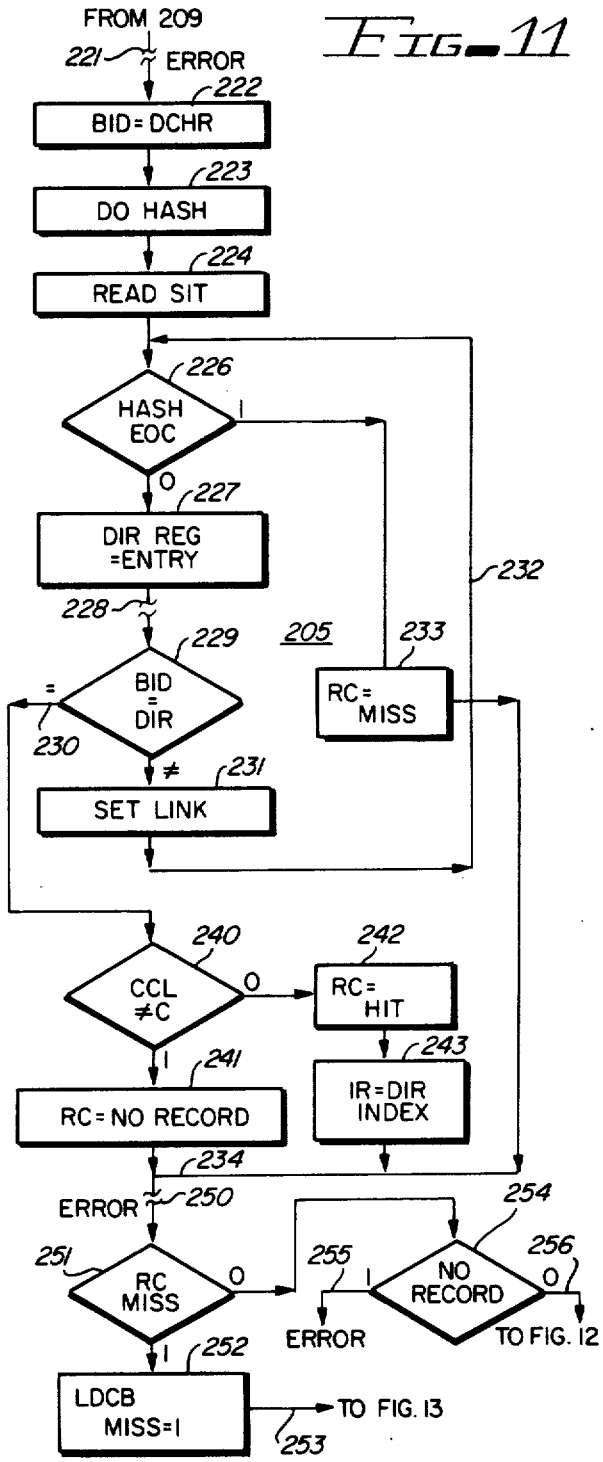
FIG.—10    FIG.—11

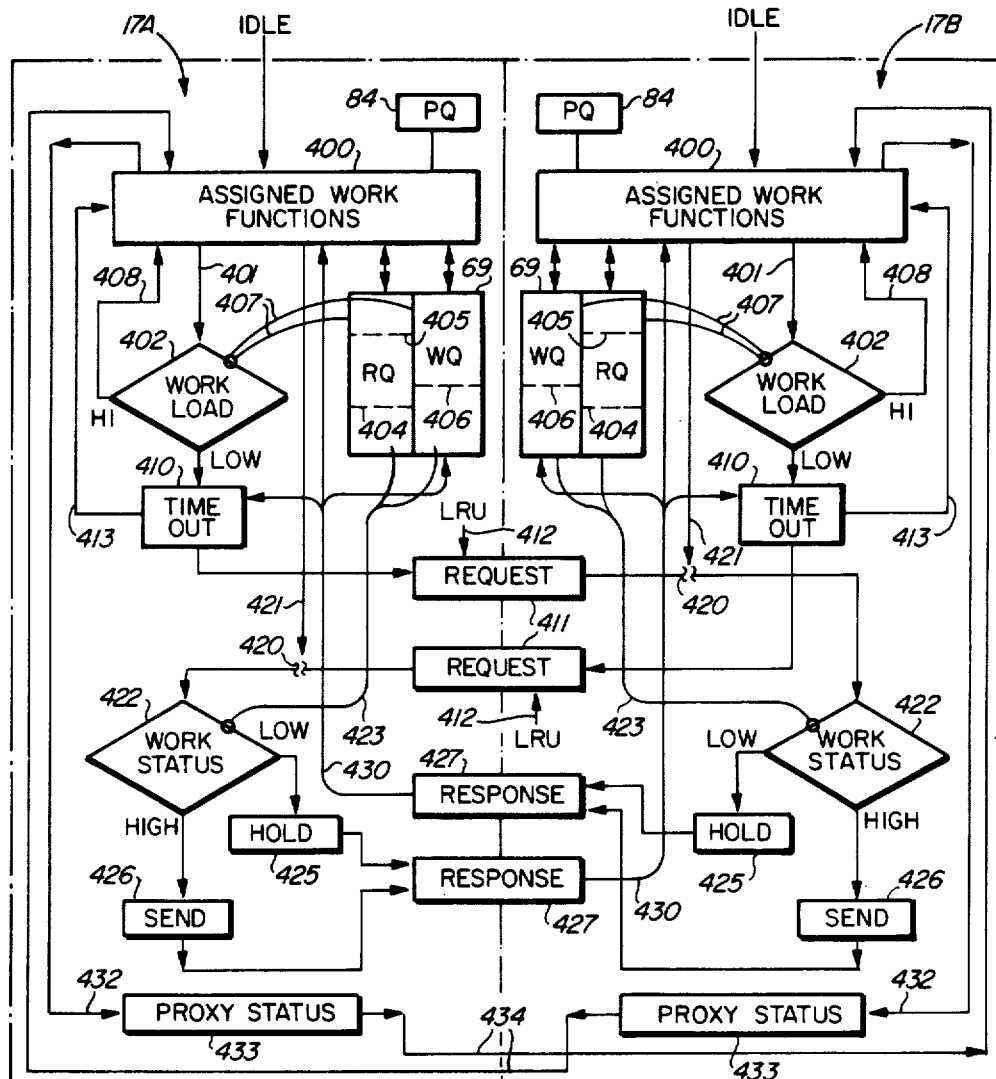

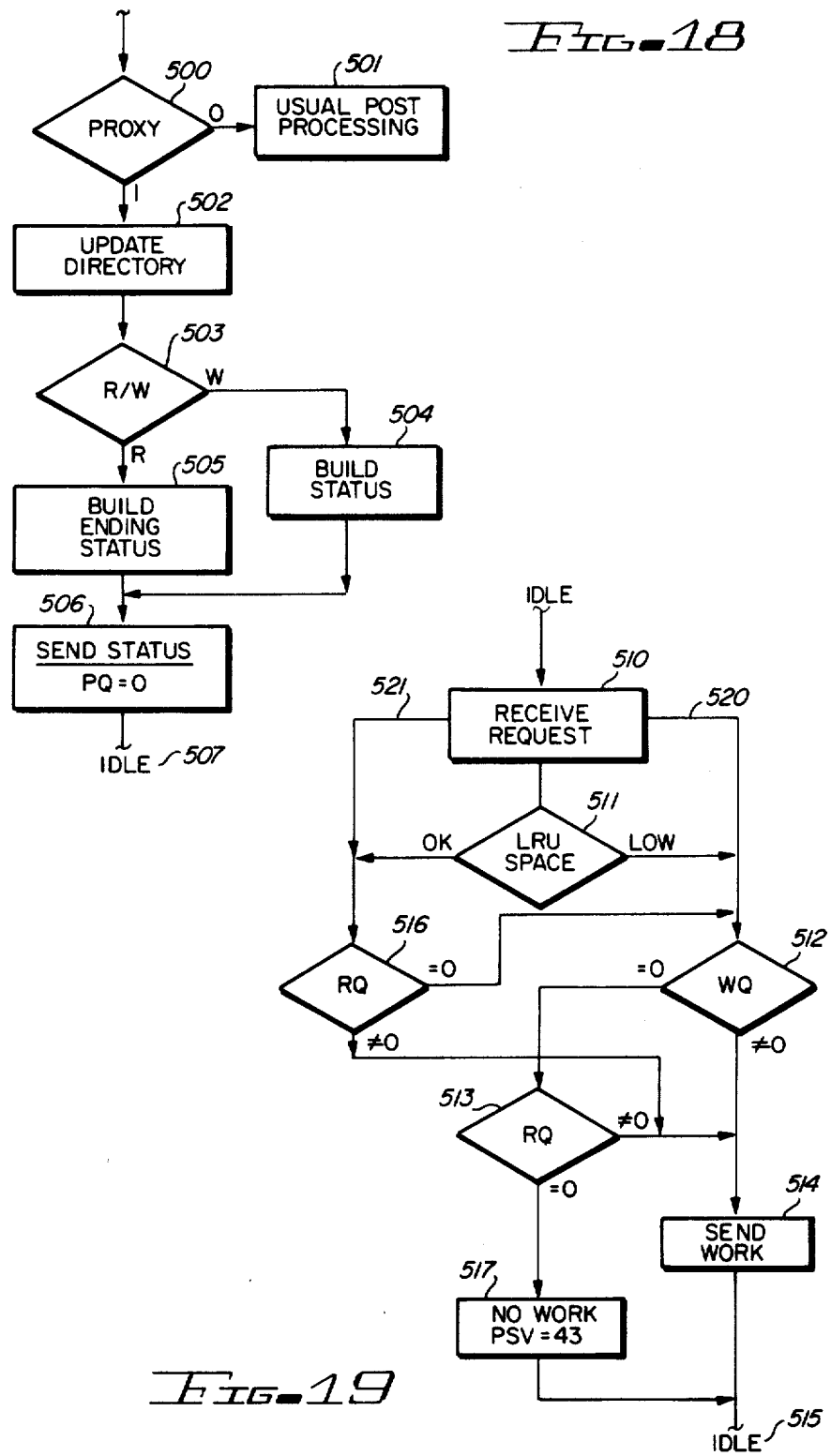

LOAD BALANCING IN A MULTIUNIT SYSTEM

DOCUMENT INCORPORATED BY REFERENCE

Co-pending commonly-assigned application for patent Ser. No. 289,631, filed August 3, 1981, now U.S. Pat. No. 4,430,701, is incorporated for its showing of a single write queue, a plurality of logical devices for each physical device, and one write queue for each physical device.

BACKGROUND OF THE INVENTION

1. Field of the Invention

The present invention relates to paging data storage systems employing a backing store, such as a DASD (Direct Access Storage Device), and a front store, serving as a cache, and preferably consisting of a random access memory.

2. Description of the Prior Art

Paging and swapping stores have taken several configurations; for example, various direct access storage devices have been used directly for storing paging and swapping data. The problem concerned with useind such devices is the relatively long access time to stored paging and swapping data which may have an adverse effect on the total central processing unit or data processing system performance. The IBM 2305 Fixed Head Storage Module described in publication GA-26-1589, available from International Business Machines Corporation, Armonk, N.Y., describes a data storage drum for use in a paging and swapping environment. An advantage of the storage drum over and above the direct access storage devices is the relatively fast access to the paging and swapping data signals. A disadvantage is the relatively high cost for a given capacity of the storage drum. Accordingly, in many paging and swapping applications, a storage drum such as the IBM 2305 unit stores active pages of data while the relatively inactive data was kept on direct access storage devices. Accordingly, a hierarchical paging storing system which automatically transfers instruction, paging and spooling data between a front store, which has high speed accesses, and a backing store having relatively large capacity and lower cost, hence a longer access, is desired.

Further, multiple exposures to the data is to be provided. That is, more than one address should be usable to access a given unit of data. In this regard, the IBM 2305 unit supported multiple requesting in that addresses 0–7 cause access to a magnetic storage drum having a physical address of 0 while addresses in the group 8–15 select the drum module having a physical address 8. Each drum, of course, could honor only one access at a given time; therefore, a given access through one of the addresses for a given drum module would place all of the addresses to that given drum module in a so-called busy or non-accessible state. A greater flexibility in the multiple addressing area is desired for enhancing execution of programs of instructions and transferring paging and swapping data sets.

Hierarchical data stores for diverse applications have been employed with diverse backing stores, for example, backing stores can be in the form of magnetic tape recorders, magnetic disk storage apparatus, such as direct access storage devices (DASD), relatively slow volatile random access memories, magnetic bubble or shift register type of memories, tape library systems and the like. Front stores, which are designed to mask the relatively long access times to a backing store have also taken diverse types of configurations. For example, in the IBM 3850 Mass Storage System, a backing store consisted of a magnetic tape library while a front store consisted of a plurality of direct access storages devices. Here, the access to the direct access storage devices was relatively fast when compared with access to data stored in a data cartridge contained in the automatic tape library.

In the Eden U.S. Pat. No. 3,569,938, a hierarchical store is presented as being an apparent store to a using data processing system. A cache concept is shown in this patent wherein a relatively high speed store acts as a buffer to a relatively slow access store. In this instance, a random access memory serves as a front store or cache while the backing store is either tape or disk data storage apparatus. The size of the apparent store was the capacity of the backing store while the access time gave an apparent access equal to the rapid access of the front store. Another hierarchical store is shown in Spencer, U.S. Pat. No. 3,839,704, wherein a direct access storage device is buffered by a random access memory which is accessible via a directory structure. The directory structure interprets the addresses for the backing direct access storage device and converts same to a buffer address through table lookup mechanisms well known in the data processing art. Again, the purpose of the Spencer arrangement was to mask a relatively long access to the direct access storage unit. Spencer also provided for transferring data from the direct access storage devices to the buffer before the data processing system, connected to this hierarchical store, needed the data such that access time to the data was minimized. These two patents show general arrangements for caching various types of peripheral storage devices. Further controls are still needed for satisfying modern day requirements of a paging and swapping storage system.

Another technological area in which caching enhances performance is found in the main memory area of a computer or central processing unit. That is, each data processing system includes a central processing unit that has a cache or high speed store. The backing store for this cache is the usual main memory. Various techniques have been used for enhancing the caching operation such that the central processing unit instruction execution, as well as operand data transfers, are maximized. An example of controlling the operation of a cache with respect to a central processing unit and a main memory is shown in Calle, et al, U.S. Pat. No. 4,075,686. This U.S. patent teaches that it is not always wise to use the cache; that in some instances, performance can be enhanced by bypassing the cache. Cache bypass is achieved in one of several ways. In one example, the main memory is arranged in segments. Some of those segments can be dedicated for input/output or peripheral operations. All accesses to those segments bypass the main memory cache. In a similar manner, the cache for a direct access storage device could be bypassed for selected devices or portions of devices under certain circumstances. In another aspect of Calle, performance enhancement can be achieved by selectively bypassing cache on a command basis. In this instance, the command to the main memory area contains a cache bypass bit. When the bit is set to unity, the cache is not used (the main memory is directly accessed). When the cache bypass bit is reset to zero, then the cache is used.

While selective bypassing a cache can, in many instances, optimize performance of a data storage system, such as the main memory cache system or a DASD-cache system, further controls appear to be necessary for meeting the stringent requirements of modern day paging and swapping data transfers.

In a data storage hierarchy having multiple paths between devices in the hierarchy, the data movements can be advantageously load balanced to enhance performance. Also when volatile data storage units are employed in some levels of the hierarchy, storage system and data availability can be enhanced by such load balancing.

Balancing data processing loads between a plurality of units usually occurs at so-called task assignment time. That is, before data processing work ensues, a control mechanism determines which unit should do the task; once the task is assigned to a unit, that unit continues to operate even though later it may be more heavily loaded than other units in the system. An example of such task assignment balancing is found in the *IBM Technical Disclosure Bulletin*, Vol. 20, No. 3, August 1977, pp. 937-938, in the article entitled "Load Balancing Control for a Multi-processor", by J. F. Baker and D. E. Holst. This article describes a loosely-coupled multi-processor control storage and memory system having load balance tables in various processors controlling the system. Load balance is achieved at assignment time to operate even though it may be more heavily loaded than other units in the system. Load balance is achieved at assignment time based upon load balance tables which indicate a measurement of work queue depth. Load balance information is exchanged between the various processors of the memory system. The scheduling of timed processes is also described. Another example of load balancing at task assignment time is found in a similar *IBM Technical Disclosure Bulletin* article, Vol. 14, No. 11, April 1972, entitled "Input-/Output Channel/Device Load Balancing Algorithm," by L. A. Jaikes, et al, wherein a peripheral subsystem has its work balanced at work assignment time.

Central processors or hosts in a multi-processing arrangement also often load balance at task assignment time. An example is shown in U.S. Pat. No. 3,648,253 which shows tasks being assigned in a multi-processor arrangement by a programmed scheduler as later described with respect to FIG. 15 and based upon time to go on to a present task. The balancing of work loads is by assignment of tasks before the tasks are initiated. U.S. Pat. No. 4,032,899 shows a data switching network which balances data traffic on an aggregate processing load. This balancing is achieved by scheduling output traffic to ports by individual processors on an exclusive assignment basis; i.e., load balancing again is achieved when the task to be performed is first assigned.

Load balancing also has been achieved upon detection of an error condition; for example, U.S. Pat. No. 3,787,816 shows a multi-processing system which may be reconfigured in a controlled manner to redesignate the functions assigned to particular similar units so as to provide continued data processing capabilities after a malfunction or error.

Activity monitors have been employed for balancing loads. U.S. Pat. No. 3,588,837 shows a system for measuring activity of all major data paths using a time interval utilization sampling technique. The samples are dynamically recorded to represent the ratio of number of samples for revealing the number of samples in one time interval compared with the number of samples taken during an earlier time interval whereby the activity of all potential queuing points within a dynamic environment are recorded to provide statistical data concerning utilization of data processing and communication equipment. This patent shows a measurement system but not load balancing which could be driven by such a measurement system.

Not all work load balancing has been achieved at assignment time; for example, U.S. Pat. No. 4,099,235 shows a method of operating a data processing system having two real-time data processors wherein given tasks are selectively performed in one of the data processors. Such a selection depends upon the character of the task and which processor has been selected to operate on such tasks. Each of the data processors is continuously monitored for the purpose of continually determining its utilization ratio. Each processor is assigned a predetermined upper limit value of such utilization ratio which lies below the processor's overload limit. Whenever such upper limit is exceeded, the tasks being performed in the one busy data processor are diverted to another data processor such that the receiving or another processor performs the diverted task. This patent shows a utilization threshold as a method of instigating shifting of ongoing tasks between data processors. The disclosed method is preferably a ratio of the waiting time resulting from tasks being performed to the free time for indicating utilization ratio. This patent also refers to U.S. Pat. No. 3,665,404 wherein peripheral devices are switched between data processors by means of electro-mechanical switch in connection with balancing the input/output load between these processors. According to U.S. Pat. No. 4,099,235, many of the real-time operations are similar to batch processing; accordingly, tasks that are not currently being operated upon can be readily transferred between the processors. This means that only inactive tasks are transferred for purpose of a load balancing.

In a dynamic data processing system where activity can vary beyond a control of the controlling data processors, load balancing between the various data processors/data processing paths should fully accommodate subsequent unforeseen dynamic changes in activities such that data transfers for load balancing are minimized for maximizing data processing throughput.

In a paging and swapping environment, it is desired that plural accesses be provided for multitasking paging access while minimizing host controls over the storage system; that is, the paging and swapping storage system should have a good set of controls for maximizing the host or central processing unit operations while maintaining continuity of each independent operation for ensuring integrity of the paging and swapping environment. Balancing asynchronous operations between units in the environment can aid data storage system availability.

SUMMARY OF THE INVENTION

In a multiunit environment any unit having a predetermined absence of work to be performed makes inquiries of other units. The other units can transfer operations to be performed to the first mentioned unit. The evaluation of work presence and absence is preferably achieved by examining work queues of the various units. In a particular aspect of the invention, a data storage hierarchy having plural levels of operations employs internal operations which are executed substantially asynchronously to external operations related to the hierarchy. Various units at one level of the hierarchy queue work to be performed with respect to lower levels of the hierarchy. When any unit at the one level finds itself with little or none of such lower level work, it requests other units in the one level to supply it with such lower level work which the one unit then performs on behalf of one or more of the other units. In another aspect, each of the units in the one level keeps work queues listing the work to be done with respect to the lower level (such as data transfers). When one unit in the one level finds an empty queue, it makes inquiries to other units requesting a transfer of work from work queues of the other units in the one level.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 8 illustrates a cache access control usable in the FIG. 3 illustrated embodiment.

FIG. 9 illustrates a SET PAGING PARAMETERS command logic flow of execution in the FIG. 3 illustrated system.

FIG. 10 illustrates a logic flow relating to the receipt of a command in the address and command evaluator of FIG. 3.

FIG. 11 illustrates a logic flow portion of the FIG. 8 illustrated cache access control relating to directory searching of the FIG. 3 cache access control.

FIG. 14 illustrates a logic flow portion of the FIG. 8 cache access control relating to queuing read requests to a backing store when the requested data is not in the cache.

FIGS. 15 and 16 are flowcharts illustrating operation of the FIGS. 1–4 illustrated system respectively using separate and shared write queues.

FIGS. 17–19 are flowcharts detailing the machine operations for implementing the invention in the FIGS. 1–14 illustrated system.

DETAILED DESCRIPTION

Figure 1:
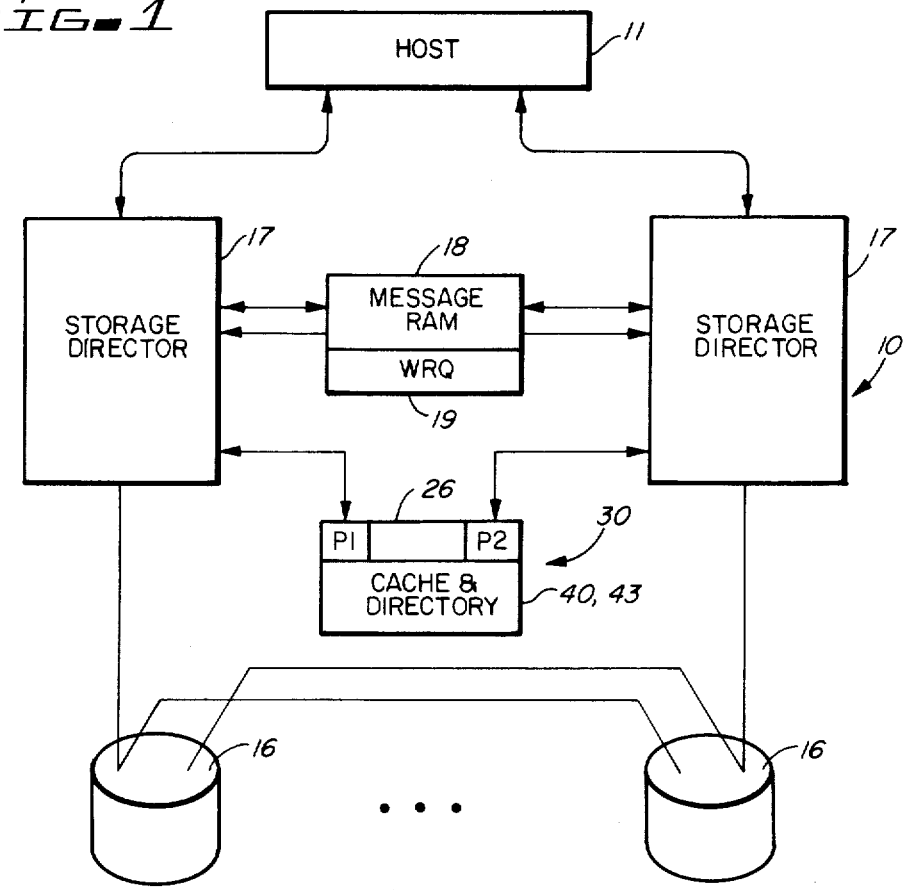
FIG. 1 diagrammatically shows a multiunit system employing the present invention.

Referring now more particularly to the drawings, like numbers indicate like parts and features in the various diagrams. FIGS. 1 through 4 show a peripheral data storage hierarchy employing the present invention. The general arrangement of FIG. 1 shows a host 11, such as a central processing unit, multiprocessing environment and the like, coupled to a data storage hierarchy 10 for storing and retrieving data for use by the host 11. Data storage hierarchy 10 includes a plurality of direct access storage devices (DASDs) 16 which are coupled to the host through either of storage directors 17. The storage directors 17 share a cache 40, which is embedded into a so-called system store 30 consisting of a random access data storage array of semiconductor units and with the usual access circuit 26. Access circuit 26 includes access control switch with a pair of input/output bidirectional ports P1 and P2 respectively connected to the storage directors 17. Included within storage 30 is a directory 43 stored in the semiconductor data storage array for identifying what data is stored in the cache. The directory relates the addresses of such data stored in the cache with DASD 16 addresses such that host 11 can access data stored in cache 40 by using DASD 16 addresses. The operation of cache 40 with respect to DASD 16, storage directors 17 and host 11 will become apparent.

For balancing the work load by one storage director 17 doing work on behalf of another storage director, control messages are exchanged between the storage directors via a message RAM (random access memory) 18 coupled to both storage directors 17. The operation is such that when one of the storage directors 17 has a light or no work load, it supplies a request message to the other or work sending storage director 17, via message RAM 18, requesting work to be transferred. The work sending storage director 17 then examines its work load and if appropriate, responds by supplying the predetermined number of work jobs to the requesting storage director. The requesting storage director then executes those jobs on behalf of the work sending storage director. In a preferred form of the invention, one data storage access request (one or more data records) for any of the DASDs 16 constitutes a unit of proxy work, no limitation thereto intended.

One of the important asynchronous operations occurring in a data storage hierarchy between storage directors 17 and DASDs 16 is recording data on the DASDs 16 stored in cache 40 that was received from host 11. Such operations, termed "writes", are queued in write queue WRQ 19. These writes constitute a major portion of the proxy work; under certain circumstances data to be "read" from DASD into cache 26 may be transferred as proxy work. In a first embodiment, each of the storage directors 17 has its own independent write queue. In a second or common write queue embodiment, as shown in FIG. 10, WRQ 19 is common to both storage directors 17. In this second arrangement WRQ 19 receives write jobs from both storage directors 17 and queues them in a single queue. As soon as either of the storage directors 17 needs to write to DASD 16 or has a light or other work status indicating that data should be written to DASD 16; then that storage director 17 accesses WRQ 19 and writes data from cache 40 associated with all of the storage directors in the data storage hierarchy into a DASD 16. This latter arrangement provides an implicit proxy work arrangement.

Figure 2:
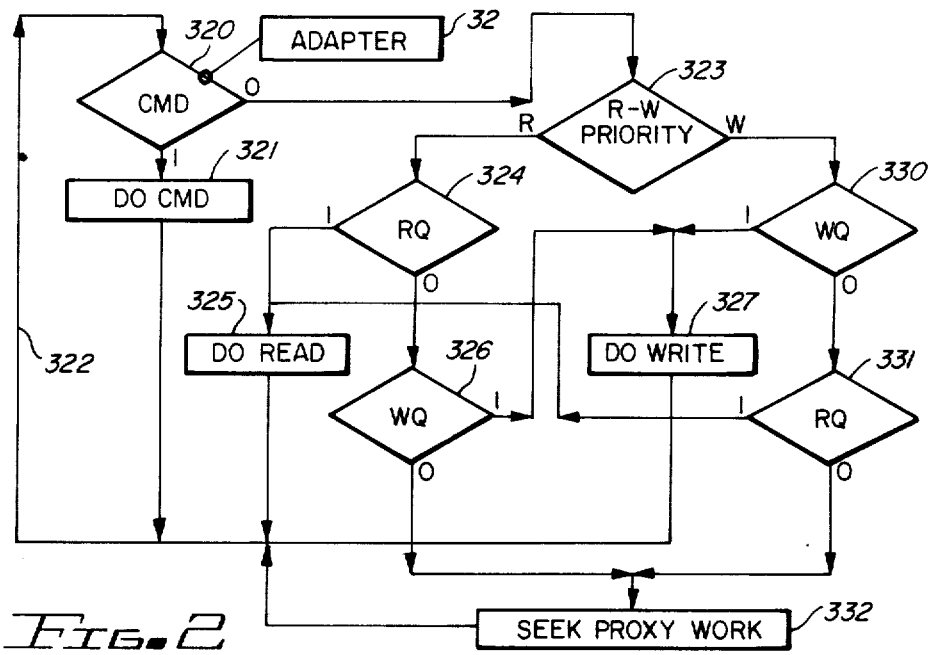
FIG. 2 is a simplified flowchart showing machine operations of the FIG. 1 illustrated system for implementing the present invention.

FIG. 2 illustrates a general machine operations flow of a requesting storage director 17 doing proxy work for work sending storage director in a data storage hierarchy. In doing proxy work, consideration is given to the prime responsibility of each storage director 17 in responding to host 11 supplied commands and other requests. For receiving host 11 commands and requests, each of the storage directors 17 includes a plurality of so-called channel adapters 32 which couple the storage director to the host 11. As shown in FIG. 2, a channel adapter 32 supplies a host request indicating signal such that the later-described digital processor in a storage director 17 can respond via an adapter 32 command received from host 11. In machine operations step 320, storage director 17 examines whether or not the channel adapter 32 has in fact received a host 11 supplied command. Storage director 17 responds to the received command (DO command) at 321; then it enters a machine operations idle loop indicated by numeral 322 to again examine the channel adapter 32 received command status. In this manner, host 11 gets priority of attention from the storage director 17 for its supplied commands. In the absence of any command being received by any of the channel adapters 32, storage director 17 examines the later-described work queues to perform the above-mentioned asynchronous operations between storage director 17, cache 40 and DASDs 16. To initiate an asynchronous operation, at 323 a read-write (R-W) priority is examined to determine whether data should be first transferred from a DASD 16 to cache 40 (read) or the reverse (write). Such priority is a function of queue lengths, cache occupancy, cache available or free space and the like. For a read priority at step 323, storage director 17 at 324 examines the read queue RQ. If asynchronous work to be done is identified in the read queue, because of the priority indicated at 323, read operations (DASD 16 to cache 40 data transfer) are performed at 325 (DO READ). Then the idle loop 322 is again entered looking for a received command. In this manner, the asynchronous operations and command executions (synchronous operations with respective hosts 11) are dynamically interleaved. In the event at step 324 storage director 17 finds no work to be done in the read queue RQ, then in step 326, it examines the write queue WQ. (This queue can contain all write activity, both local and proxy.) In the event an entry occurs in its write queue, such as WRQ 19, a write is performed at 327. Then again, idle loop 322 is entered to again look for a host-supplied command. Under certain circumstances, it should be appreciated that the receipt of a command can interrupt the above-described asynchronous operation. That is, time elapses between the determination that an asynchronous operation is to be performed and the actual data transfer. During such delay, commands can be executed without interfering with the asynchronous operations.

If at step 323 storage director 17 finds that the priority of asynchronous operations indicates that data writes should be made from cache 40 to a DASD 16, storage director 17 at 330 examines the write queue WQ first. For any queued write, the DO WRITE step 327 is executed. For an empty write queue at step 330, storage director 17 proceeds to step 331 for examining the read queue RQ. Again, if an entry is found in RQ, then the queued read operation is performed at 325.

When there is no command to be executed at step 320, and there is no asynchronous work to be done as indicated in the read and write queues, then from step 326 or 331 the storage director 17 seeks proxy work at step 332. Such proxy work is then added to the read or write queues or can be separately performed by the work requesting storage director. Through an intervening time of setting the proxy work and actually executing the data transfer, idle loop 322 is again entered. In this manner, the proxy work is also dynamically interleaved with command executions and with other asynchronous operations. The data transfers between cache 40 and DASDs 16 are so well known that they are not described.

Figure 3:
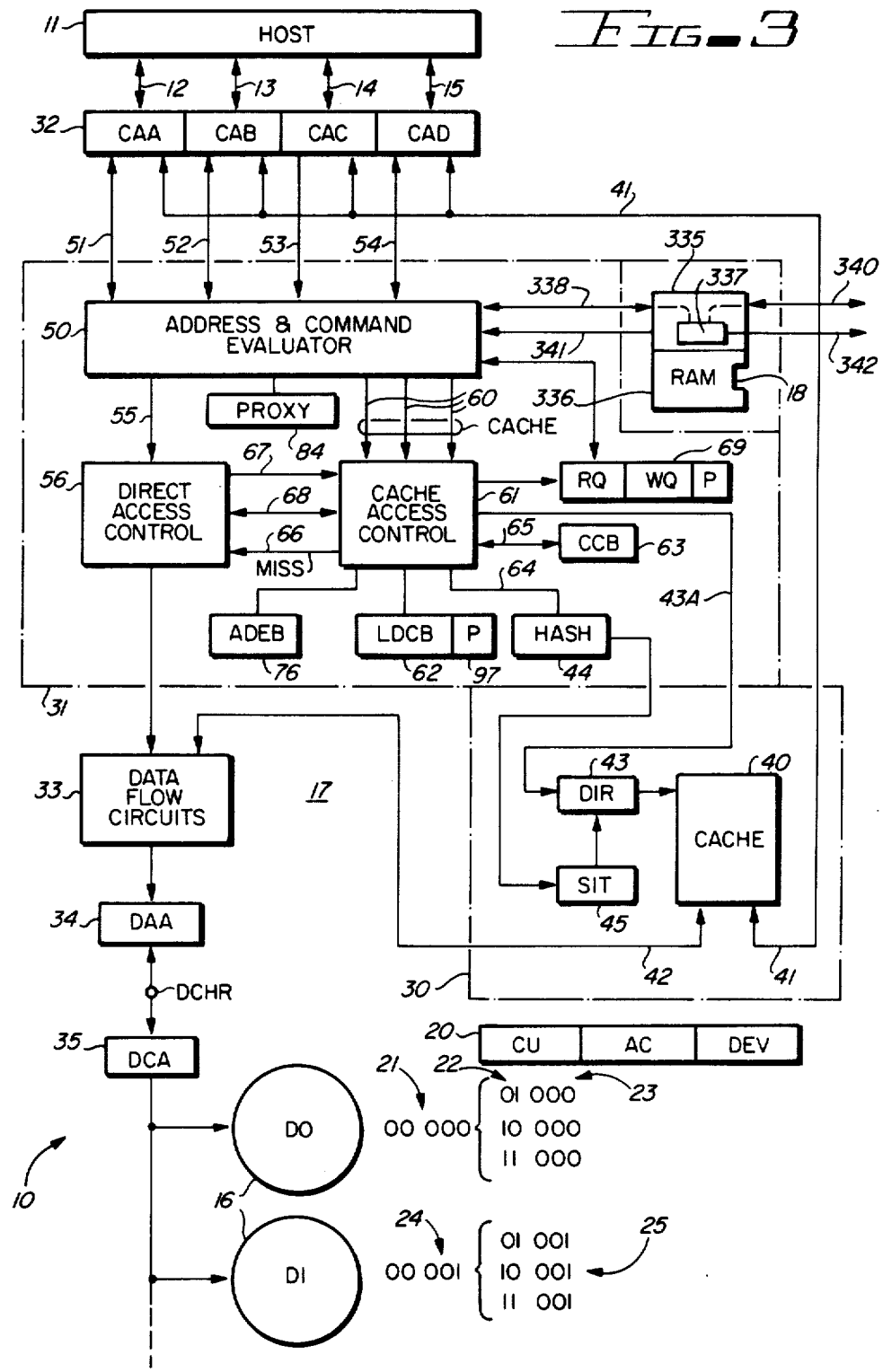
FIG. 3 is a logic diagram of a hierarchical paging and swapping storage system employing the principles of the present invention.
Figure 4:
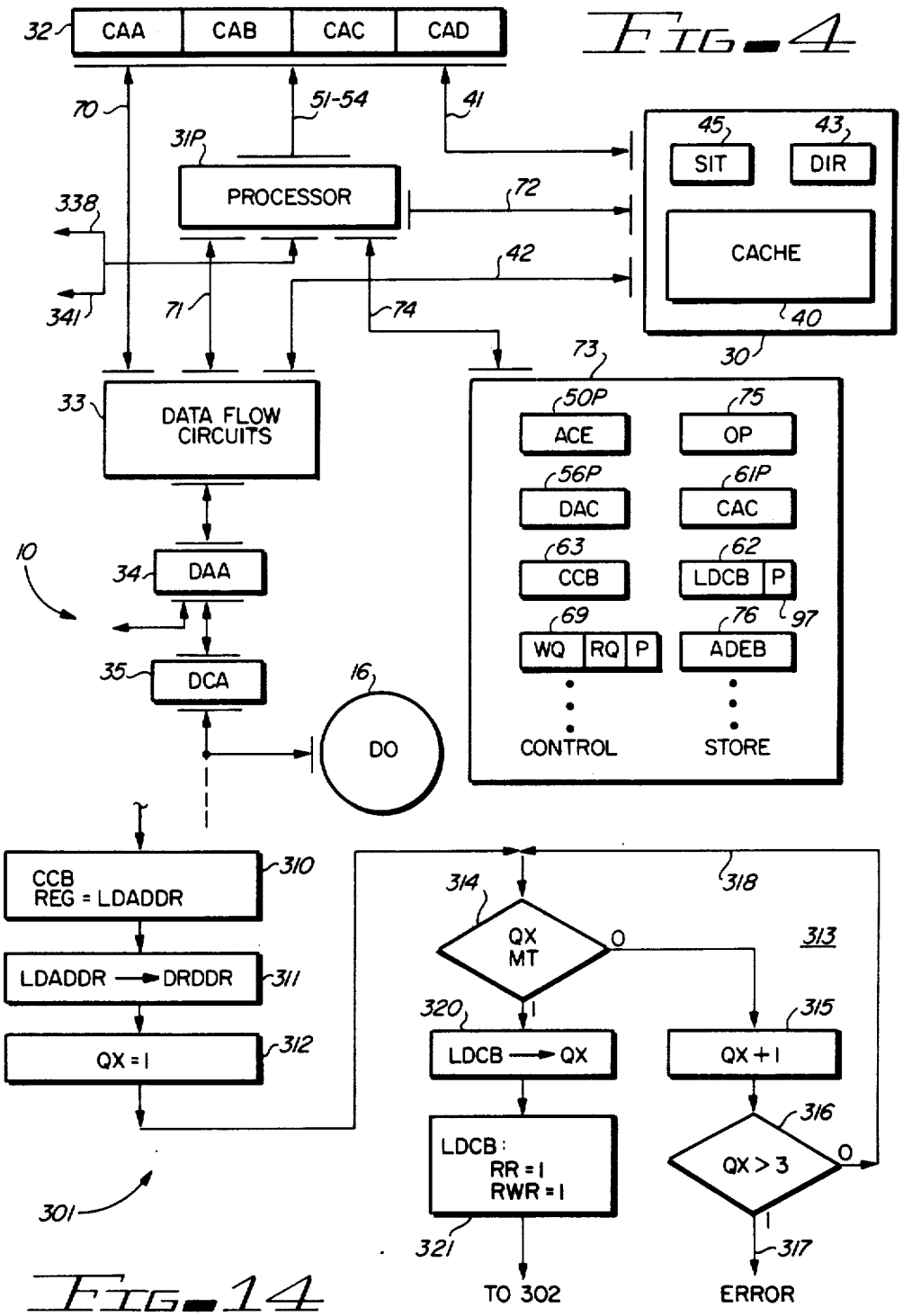
FIG. 4 shows a preferred implementation of the FIG. 1 illustrated system.

FIGS. 3 and 4 illustrate a peripheral system 10 for employing the invention. FIG. 3 illustrates the system in a logic form while FIG. 4 illustrates the system in an electronic circuit or hardware form. In FIG. 3 a single host 11, the term host includes central processing unit, data processing system, a multiprocessing environment acting as a single unit and the like, communicates with the peripheral system 10 for paging and swapping data. A plurality of input/output connections 12, 13, 14, and 15 connect host 11 to peripheral system 10, a paging store. These input/output connections can be those used with IBM computers, as is well known. The paging and swapping data is stored in a backing store constituting a lower level of a two-level hierarchical store. The backing store consists of a plurality of DASDs (direct access storage devices) 16. Each storage director 17 constitutes a path means coupling cache 40 to DASDs 16. In the illustrated embodiment, a single so-called string of such DASDs 16 is shown; it is to be understood that the string is switchable between the plurality of directors 17 using known techniques and as diagrammatically shown in FIG. 1. The operation is such that 4,096 byte blocks of data are rapidly transferred between host 11 and the DASDs 16. The eight DASDs 16, respectively, have device addresses D0–D7 for independent access via any of the input/output connections 12–15. That is, host 11 can address any of the DASDs 16 over any of the input/output connections. In addition to the multiple access paths, a plurality of access addresses for each of the DASDs 16 is provided. Such access addresses are in an address form indicated by numeral 20. The control unit or system 10 address is indicated by portion CU which typically can be three bits. The actual or physical DASD 16 address is indicated in portion DEV which for eight devices has three bits. Modifying the actual address of the DASDs 16 is an access or exposure address modifier AC, which in the present embodiment consists of two bits. The addressing of device D0 by the four accesses may include a direct access 21 in which the AC portion is all zeros. Three additional accesses to device D0 can be via cache 40 and are identified by the AC bit patterns 22 consisting of 01, 10, and 11. The device address portion for all three accesses remains the same. When host 11 accesses the data on a DASD 16 using one of the four accesses, including accessing the data via cache 40, each of the accesses is treated as a separate logical device such that a plurality of independent input/output operations are performed with respect to any DASD 16, one independent operation for each of the accesses. Depending upon the electronic circuit configuration of a particular peripheral system 10, a DASD 16 can be accessed by the address 21 simultaneously and independently of the accessing cache 40 by the three indicated cache-related device addresses. Address 21 can be provided by host 11 for any of the input/output connections 12–15, as can be any of logical device accesses. Device D1 is accessed directly by address 24 consisting of AC being zeroes and the DEV portion being 001. The logical device or cache accesses 25 are similarly patterned as described for logical device accesses 22, 23 for all DASDs 16.

The front store or upper level of the paging store hierarchy of peripheral system 10 includes a system storage 30 which is operationally accessed and controlled by control 31. Signal transfers between system storage 30, control 31 and host 11 is via a plurality of channel adapters 32 which are individually denominated CAA, CAB, CAC, and CAD. These channel adapters are those attachment circuits found in control units attaching to IBM computers via the input/output interconnections 12–15. Signal transfers between DASDs 16 and system storage 30 under direction of control 31 is via a set of data circuits 33 which convert the usual digital signals found in data processing systems to a serial format and protocol usable with disk storage apparatus, such as is well known in the art. Data flow circuits 33, in turn, transfer signals through device adapter DAA 34, then through disk controlling adapter DCA 35. DASDs 16 are addressed by an address DCHR wherein the D corresponds to the device address DEV, C indicates the cylinder address, H indicates the head (recording surface) address, while R indicates the record number. The record can be rapidly located by rotational position on the disk storage apparatus, as is well known. System storage 30 has three major portions: the first and larger portion 40 is a cache for storing paging data to be rapidly accessed by host 11 and for storing paging data to be written to DASDs 16 such that host 11 need not wait for the DASDs 16 to accept such data. The principle of caching is shown in the prior art references discussed in the background of the invention. Access to the data stored in cache 40 is via a directory 43 consisting of a plurality of registers which contain signals identifying the address of DASDs 16 (DCHR), the address of registers in cache 40 where the data is stored and other control information, as will be described later with respect to FIG. 5. Since cache 40 is relatively large, i.e., several megabytes, access to the cache 40 is enhanced by employing a so-called hashing technique implemented in hash circuit 44. Hashing addresses is well known and the method of hashing is not pertinent to an understanding of the present invention and hence is not further described. The output of the hash circuit 44 addresses a scatter index table 45, also denominated SIT, which indexes the hashed address to directory 43 for addressing the directory 43 for accessing cache 40. In each cache access, one or more directory entries may be involved. A plurality of entries relating to a given hash output is called a hash class linked together using a singly or doubly-linked list such that a single access to directory 43 results in a complete scan of cache 40 for a given range of addresses. Cache 40 transfers signals with channel adapters 32 over internal bus 41 and with data circuits 33 over internal bus 42. The transfer of such data signals between the random access memory used for system storage 30 and other DASDs 16 is well known and not further described for that reason.

Control 31 has three major portions: The first portion, address and command evaluator (ACE) 50, connects to channel adapters 32 via the respective bus connections 51, 52, 53, and 54. ACE 50 receives various input/output commands from host 11 via the channel adapters 32, partially decodes same, determines whether or not the DASD address provided with a command from host 11 is a direct access or a logical access as explained earlier with respect to the addressing scheme. When a direct access is indicated by an address 21, 24, etc., ACE 50 activates direct access control 56 (DAC 56). DAC 56 is constructed using the techniques for control units which couple direct access storage DASDs 16 to host 11; such access controls are well known and not detailed with respect to such direct access. Operation of host 11 through DAC 56 to DASDs 16 includes the ability to reserve the DASDs 16 to host 11 via any one of the channel adapters 32. This means that access to the addressed device is limited to a specific channel adapter 32. The principles of reserve and release as practiced with IBM computers are well known and is not further described for that reason.

ACE 50 in receiving the commands with associated addresses from host 11 can detect one of the three logical accesses, such as indicated by numerals 22, 23, or 25. In this instance, ACE 50 communicates with cache access control CAC 61 via one of the paths 60 for accessing cache 40 to store paging data into cache 40 or to retrieve paging data from cache 40. When a logical access is specified with the command from host 11, DASDs 16 cannot be reserved; that is, if device D0 is reserved to channel adapter CAA for access by host 11, host 11 can still send an independent request for data over path 14 through CAC 61 to storage system 10. In the event the requested data is not in cache 40, CAC 61 via path 66 accesses the addressed DASD through DAC 56 even though such addressed device is reserved for accessing to channel adapter CAA. In this manner, the DASDs 16 are reserved for certain data processing operations but completely left open for access for paging data operations.

CAC 61 operates with a plurality of status indicating registers. For example, LDCB (logical device control block) registers 62, as later explained with respect to FIG. 5, contain control information signals relating to the logical device accesses via cache 40 such that each requested access is independently handled. The transfer of data signals via bus 41 between cache 40 and channel adapters 32 is indicated by signals stored in a set of registers termed channel control block (CCB) 63. Access to cache 40 is started by requesting a hash operation via bus 64 to hash circuits 44. Once circuits 44 identify the correct entry in directory 43, the entry is transferred from system storage 30 to a set of registers ADEB (active directory entry buffer) 76 such that CAC 61 can operate with cache 40 without referring further to system storage 30 to obtain such control information. If the directory 43 indicates that data requested through a logical access is not in cache 40, i.e., there is no directory entry, then the requested data must be transferred from a DASD 16 to cache 40 for relaying to host 11. This action is achieved in a highly asynchronous manner by queuing the read requests in a set of queue registers 69 as queue RQ and as later described with respect to FIG. 5. In certain instances, CAC 61 will have prior address information such that directory 43 can be accessed without resorting to hash circuits 44 or SIT 45. This access is indicated by bus 43A directly accessing directory 43. CAC 61 in handling a miss of data in a cache 40 request accesses DASDs 16 via path 66. Further communications are indicated by double-headed arrow 68. When DAC 56 has transferred the data signals from the DASD 16 to cache 40 via bus 42 (which may be combined with bus 41 when simultaneous transfers to and from cache 40 are not implemented), DAC 56 notifies CAC 61 via path 67 that paging data has been staged or promoted to cache 40. Then CAC 61 supplies an appropriate indicating signal to host 11 such that host 11 can then rerequest the data from system 10 such that it will be promptly relayed to the host 11 from cache 40. Such procedures are known in the prior art and have been referred to as channel command retry when used in connection with IBM data processing systems.

The input/output commands supplied by host 11 to peripheral system 10 are those used in connection with operating disk storage apparatus. Other commands for the logical accesses include set paging parameters which prime CAC 61 as will be described. The address structure 20 for the multiple accesses is similar to the address structure for those disk storage apparatus using only direct access addresses. Accordingly, in practicing the present invention, minimal changes are required in the input/output arrangements with a host 11 over and above the usual direct access storage device system as employed through DAC 56. It should also be noted that the operation of cache 40 with respect to DASDs 16 and host 11 provides enhanced and simultaneous accesses for achieving an apparent store through caching principles; it has high performance, yet large capacity.

In implementing proxy work within storage director 17, a proxy queue 84 is added to ACE 50 as will become more apparent. As mentioned earlier, for proxy write operations the queue WQ can be used for both local and proxy operations. Proxy queue 84 is still useful for proxy read from DASD to cache operations. Proxy queue 84 in the preferred embodiment contains only one proxy work job per DASD 16, such as a write or read operation conducted with respect to a DASD 16. Additionally, when read proxy jobs are employed, a proxy bit P 97 is included in LDCB 62. Additionally, the work queue 69, shown as a separate queue for each of the storage directors 17, includes a read queue RQ, write queue WQ and may include a proxy bit P for indicating that upon completion of the asynchronous proxy work job, not employing a common or shared work queue, a response must be supplied to the other storage director 17 so that it can update its corresponding records. The message RAM 18 includes access and communications circuits 335 enabling the storage director 17 to access the ram array 336 and give instructions for providing communications through a corresponding message array in the other storage director 17; that is, the message array 18 as shown in FIG. 1 in a preferred embodiment consists of two arrays, one in each of the respective storage directors 17. In the alternative, a single message RAM 18 may be provided with the packaging being in either of the storage directors 17. In message RAM 18, control 335 includes the usual access and communication control circuits 337 which are well known in the data processing art. Data flow, i.e., the parameter data is transferred with message 18 over busses 338 and 340 such that the ACE 50 transferred proxy data goes to proxy queue 84, updates P bit 97 and work queue 69. Such parameter data is sufficient to allow ACE 50 to supply the appropriate command to CAC 61 and DAC 56 in the same manner that it supplies commands in response to host 11 supplied requests. The usual handshaking tag controls are provided between control 337 and ACE 50 as represented by line 341 and to the other storage director as represented by line 342. Since such tag controls are well known, they are not detailed for allowing the description to accent the invention.

FIG. 4 illustrates a preferred implementation of the FIG. 3 illustrated arrangement. Control 31 of FIG. 3 is implemented in a computerized form as shown in FIG. 4 which includes digital processor 31P which communicates directly with channel adapters 32 via paths 51–54. Data flow between the host 11 and DASDs 16 is via a bus 70 extending directly from channel adapters 32 to data flow circuits 33. Channel adapters 32 have known switching circuits for switching to and from bus 70 as is practiced in most present day control units. Processor 31P controls data flow circuits 33 via bus 71 as is well known and not further described for that reason. Processor 31P communicates with system storage 30 via bus 72. Bus 72 typically will carry address signals, read command signals, write command signals and the like to system storage 30. Processor 31P is controlled by a set of so-called microcode programs stored in control store 73. Processor 31P fetches the microcode programs via bus 74 to enable processor 31P to perform all of the control functions described for the FIG. 3 illustrated control 31. For example, address and command evaluator ACE 50 has its functions performed by processor 31P executing programs ACE 50P. In a similar manner, direct access control DAC 56 has its functions performed by processor 31P executing programs CAC 56P; cache access control 61 corresponds to programs CAC 61P. Of course, operating a storage system requires many other programs for diagnostic purposes and the like indicated by OP (other programs) 75. Control store 73 also contains the addressable registers LDCB 62 (which includes proxy bit 97), ADEB 76, the queuing registers 69 (including WR, RQ and P), CCB 63, may contain SIT 45 as well as other registers not pertinent to the present invention but which processor 31P may use for operating storage system 10. For example, hash circuits 44 can have their functions performed by OP 75. Communications with SIT 45 in system storage 30 (or in control store 73, as the case may be) from OP 75, of course, is through processor 31P executing the programs and sending appropriate output control signals over bus 72 to system storage 30; when SIT 45 is in control store 73 operations are speeded up.

Figure 5:
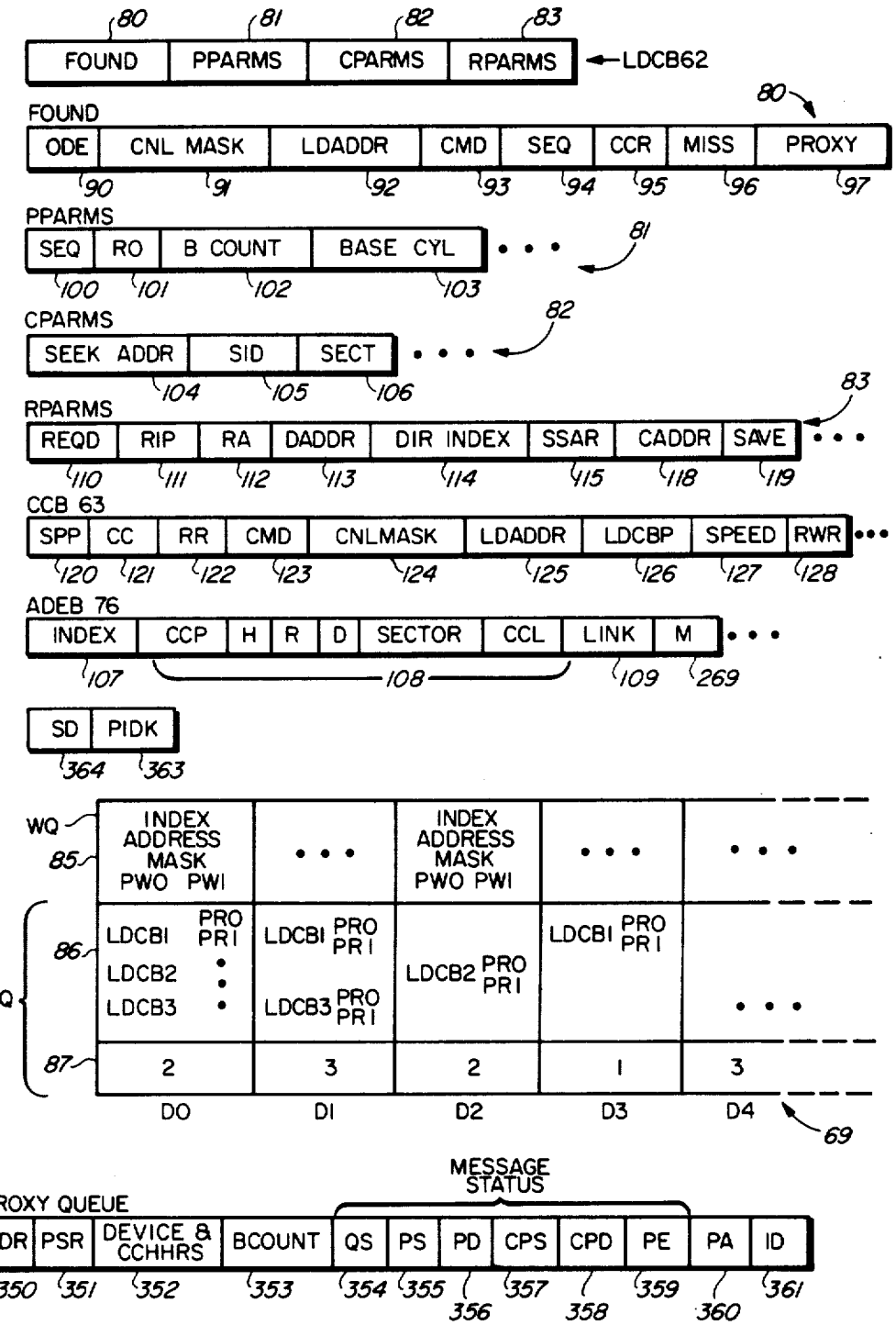
FIG. 5 illustrates sets of control registers usable with FIGS. 1–4 illustrated system.

Before continuing with the detailed description of the operation of the present invention as embodied in the FIGS. 3 and 4 illustrated data storage system, the registers for containing control data necessary to a successful practice of the invention in the illustrated embodiment are described with respect to FIG. 5. LDCB 62 contains control data for processor 31P to successfully process all storage system 10 actions with respect to each of the logical devices. There are three logical device control blocks for each of the DASD 16. In an eight device storage system 10, there would be 24 logical devices control blocks. The direct access to DASDs 16 handled through DAC 56 do not require a logical device control block; DAC 56 handles the accessing as in prior art disk storage apparatus systems.

LDCB 62 is best understood by arranging the control data into four major portions. A first portion, foundation 80, relates to that control data describing the basic architectural functions of the illustrated embodiment. PPARMs 81 (paging parameters) contain control data relating to the SET PAGING PARAMETERS command received from host 11. CPARMs 82 (command parameters) contain control data relating to SET SECTOR, SEEK and SEARCH ID commands received from host 11. RPARMs 83 (read parameters) relate to those control data for accessing DASDs 16 for the purpose of transferring data signals to cache 40.

Foundation portion 80 insofar as the practice of the present invention is concerned includes the following control data fields: ODE 90 is a single bit indicating a device end (DE) is owed to the host with respect to the logical device associated with the present LDCB. Channel mask (CNLMASK) 91 indicates which of the channel adapters 32, hence which of the channels, of host 11, have activated the logical device for accessing data from an identified DASD 16 via cache 40. The logical address 92 (LDADDR) identifies which of the logical addresses is associated with the LDCB. For example, a DASD 16 LDADDR 92 would contain the bit pattern 01000 for a first of the three logical devices based upon DASD 16. As a practical matter, the addressing of the LDCBs is by logical device address used as an offset from a base address. The LDADDR section 92 constitutes a verifying and self-identifying function of LDCB 62. Any command that was received from host 11 that is currently active in the system 10 for the identified logical device is stored in CMD 93. SEQ 94 is a single bit identifying whether or not sequential access has been indicated by host 11. This bit being active indicates that the host 11 will read a succession of paging blocks of data primarily in a predetermined sequence. CCR 95 is a bit indicating that a channel command retry (CCR) is in progress, i.e., has been sent to host 11. Channel command retries are part of the known IBM input/output system operations and are used when a cache 40 miss occurs. MISS bit 96 indicates that a scan of DIR 43 indicataed a MISS condition, i.e., no desired data was in cache 40 or no space is allocated in cache 40 for data to be written by host 11. Proxy bit P 97 resides in foundation portion 80. Other control fields, of course, would be found in this area, but those are not pertinent to an understanding of the present invention.

PPARMs 81 include SEQ 100 for indicating that a number of contiguous block addresses will be referenced by host 11. SEQ 100 contains the same information as SEQ 94. RO 101 indicates that any paging blocks transferred from cache 40 through channel adapter 32 to host 11 as a result of a READ command from host 11 may be invalidated following the data transfer. B COUNT 102 indicates the current number of paging blocks yet to be processed. BASE CYL 103 indicates the base cylinder address received during execution of a set paging parameters command. Other fields not pertinent to the present invention would also be included in PPARMs 81.

CPARMs 82 contain the SEEK ADDR 104 which contains the address of a DASD 16 together with its cylinder and track addresses for performing a disk storage apparatus seek as is well known. SID 105 contains the search identification argument. SECT 106 contains the current set sector value, i.e., the rotational position of disk storage apparatus for accessing a paging block.

RPARMs 83 include REQD 110 for indicating that access to a DASD 16 is required to satisfy a host request, i.e., data has to be transferred from a DASD 16 to cache 40 for relaying to host 11. RIP 111 indicates that a current transfer from a DASD 16 to cache 40 is in progress. RA 112 indicates that some post processing for the DASD 16 transfer to cache 40 is in progress. Other control flags for indicating status of the relationship between DASDs 16 and cache 40 can also be included in the RPARMs 83. DADDR 113 contains the address of a DASD 16 involved with the read operation. DIR INDEX 114 is an index to directory 43 which is used for calculating the address of the corresponding entry in the directory indicated by DADDR 113 and the corresponding cylinder head and record identification. SSAR 115 contains the identity of the storage address register (not shown) of system storage 30 which will be used in connection with reading a paging block from a DASD 16 to system storage 30. In this regard, system storage 30 can have a plurality (8 or 16 for example) of address registers (not shown) which are addressable for facilitating more rapid data transfers between the host 11 and cache 40 as well as between DASDs 16 and cache 40. A single SSAR is also acceptable. CADDR 118 contains a current address of the cache block for transferring signals between cache 40 and a DASD 16. SAVE 119 is a temporary save area for parameters for disconnected operations as is practiced in the usual manner in data processing, particularly in the control of peripheral devices.

CCB 63 includes SPP bit 120 which signifies whether or not a SET PAGING PARAMETERS command has been received. The SET PAGING PARAMETERS command enables access to system storage 30 for operation in a paging mode. CC bit 121 indicates that command chaining has been set up by host 11. Command chaining is that operation tying a set of commands together as is widely practiced in the data processing art. RR bit 122, indicates a read retry is active in system storage 30. For example, an error condition can occur; recovery from that error condition may require a read retry. Details of the retry are not shown in the present description. CMD 123 contains the current or last command received from host 11 and which is currently being handled in storage system 10. CNL MASK 124 identifies which channel adapter 32 conveyed the CMD 123 contents to control 31. LDADDR 125 contains the address of a logical device currently selected by host 11. LDCBP 126 is a pointer or address value pointing to the LDCB 62 associated with the current logical device. SPEED 127 indicates the data rate of a connected channel. RWR 128 relates to overrun counts before retry is avoided; since thresholds for retries is well known, such action is not described in the present application. CCB 63 may contain additional control bits and fields as design practices dictate.

ADEB 76 contains one entry of DIR 43. Accordingly, the description of ADEB 76 will also describe DIR 43. INDEX 107 is the logical address of the instant directory entry. This field provides self-identifying data in each entry. INDEX 107 contains the same information as contained in DIR INDEX 114 of RPARMs 83. Section 108 contains the address of the DASD 16 storing the data which may be replicated in cache 40 or is to be replicated in cache 40. CCP indicates the cylinder address of the physical device while CCL indicates the logical cylinder address of the device. H indicates the head address, i.e., which surface of the DASD 16 is to be accessed, D is device address, R is the record number and SECTOR contains the sector address, i.e., rotational position. D corresponds to DADDR 113. From the above, it can be seen that LDCB 62 provides all of the controls for the logical devices while DIR 43 and ADEB 76 contain the controls for the DASDs 16 independent of the logical devices. That is, operation of storage system 10 between the DASDs 16 and system storage 30 is the same for all logical devices. Control 31 provides the separation and continuity of logical devices which exist between host 11 and system storage 30 for providing multiple accesses to a DASD 16. LINK 109 of ADEB 76 links the entries of DIR 43 of each hash class. In other words, hash circuit 44 via SIT 45 accesses a first entry of DIR 43. If that entry is a noncompare, then LINK 109 is used to fetch a second entry from DIR 43 which is in the same hash class and therefore identified by the SIT 45 indication for DIR 43. At the end of the hash class, LINK 109 is all zeroes to indicate end of hash or chain of DIR 43 entries. If all zeroes are encountered in SIT 45, a miss has occurred. Of course, directory 43 can contain additional fields for each entry which is beyond the scope of the present description.

The data transfer operations between system storage 30 and DASDs 16 are asynchronous and substantially independent of operations between host 11 and DASDs 16 as well as the operations between host 11 and system storage 30. To achieve this independence, a set of read queues RQs and write queues WQs are established in a set of queue registers 69. Queue 69 includes write queue 85 which has a separate queue for each of the devices labeled D0–D4 . . . Each write queue register contains the index corresponding to INDEX 107 of DIR 43. The queue also stores the address necessary for accessing the appropriate DASDs 16 which includes a seek argument, search argument, sector, device, write and read masks and the address portion for accessing cache 40, such as the cache block address and the SSAR (not shown) for addressing system storage 30. When a proxy write job is sent to another storage director 17 the write queue WQ 85 can be erased such that duplicate writes will not occur. However, it is important to make sure that the asynchronous write will occur. Accordingly, it may be desired to indicate within write queue 85 that a proxy write has been outputted to the other storage director. Such indication is indicated by the single bit PWO in the respective device related write queue. PWO indicates to the storage director sending a proxy write job to the other storage director, that a proxy write to a given DASD 16 has been initiated. In one embodiment of the invention, a received proxy write job will be in the single proxy queue 84 for a DASD 16. For mixing writes from both storage directors, an input proxy write bit PWI is included in WQ 85 for indicating to the storage director 17 as it scans WQ 85 to check the proxy queue 84 for additional write operations to the corresponding DASD 16. ID 361 stores the identification of the proxy work job represented by the signals stored in later described items 350–360. Such ID is generated by a requesting storage director 17 counter PIDK 363, a proxy identification counter. PIDK 363 is incremented each time a proxy request is sent to another storage director 17. Such ID includes identification of the storage director in static field SD 364. In WQ 85, a link field can be included to point to a next entry in the write queue 85 for the given device or for pointing to the next device write operation, i.e., which page in cache 40 is to be next written to a DASD 16. Accordingly, each write queue 85 can contain one or a plurality of write operations for given DASD 16.

Queue 69 also includes read queues RQ each of which includes portions 86 and 87 which constitute a round-robin queue. Portion 86 contains the LDCB 62 addresses for identifying which logical devices require data transfers from the corresponding DASD 16 to cache 40. Portion 87 indicates a pointer to one of three possible entries in each queue for indicating which logical device is to be next serviced. For example, D0 portion 87 contains numeral 2 indicating that LDCB 2 is to be next serviced; following LDCB 2 then LDCB 3 will be serviced, then LDCB 1, etc. D0 has a full read queue for all associated logical devices. Device D1 has two entries. In this read queue LDCB1 and LDCB3 with the pointer number 3 in portion 87 indicates that LDCB3 is to be next serviced. Accessing the read queue 86–87 enables processor 31P to access the correct LDCB 62 for transferring data from a DASD 16 to cache 40 in an appropriate sequence relative to the sequence that the data was requested by host 11. Other forms of priority determination may be used while practicing the present invention. For better tracking proxy read requests, RQ portion 86 for each LDCB entry can include two bit positions PRO and PRI. PRO indicates that a proxy read has been outputted to the other storage director 17 while PRI signifies that a proxy read has been inputted from the other storage director 17. Proxy bit 97 can include both PRO and PRI bits. The operation of the read proxy bit is the same as that described for WQ 85.

Proxy queue 84 in a first embodiment in which one and only one proxy work job can be executed at a given time included one set of registers where proxy work jobs can be queued. A corresponding plurality of registers can handle a multiproxy job queue; each set of registers contains the same information plus a linking field (not shown) for linking the registers together as well as a priority indicator indicating which proxy job should be done first. As shown in FIG. 5, proxy queue 84 includes bit PDR 350 for indicating that a proxy destage has been received. A destage corresponds to a write operation for transferring data from cache 40 to an indicated DASD 16. In a similar manner PSR 351 is a single bit indicating a proxy stage has been received. A stage corresponds to a read operation in which data is transferred from a DASD 16 into cache 40. The DASD 16 address is included in register 352 which includes the device indication D0, etc., as well as the internal address designation of cylinder, head and record numbers (CCHHR). This address also provides an input to directory 43 for accessing the appropriate area of cache 40 for the data transfer indicated by bits 350, 351. Allocation and deallocation of data storage space in cache 40 follows usual procedures. At 353, the block or record count BCOUNT is stored. This allows a single proxy request to handle a plurality of records for more efficiently performing the asynchronous data transfers. QS 354 is a single bit indicating that a status query has been sent. That is, the work requesting storage director 17 has sent a query to another storage director 17 looking for proxy work. It should be noted that receipt of additional work from host 11 by the storage director 17 sending a QS to the other storage director will not inhibit the proxy operation. PS 355 indicates that a proxy stage has been started on behalf of the other work sending storage director 17. Correspondingly, PD 356 indicates that a proxy destage has been started. CPS 357 indicates the proxy stage started as indicated by bit PS 355 has been completed. In a similar manner, CPD 358 indicates completion of the proxy destage indicated by PD 356. PE 359 signifies that an error has occurred during the proxy operation; such error is to be supplied as sent to the other storage director. Bits 354 to 359 constitute message status bits signifying to the storage director 17 the status of a proxy work job. PA 360 indicates that an acknowledgement has been sent or received for a proxy operation. When QS 354 and PA 360 have both been set to unity, then a proxy query has been sent and the other work sending storage director 17 has acknowledged that request, such that the received proxy job can be performed independently of the work sending storage director 17. In addition to the registers shown in FIG. 5, other registers may be employed in constructing a storage system 10; those registers are not necessary to understanding how to practice the present invention in the illustrated environment.

Figure 6:
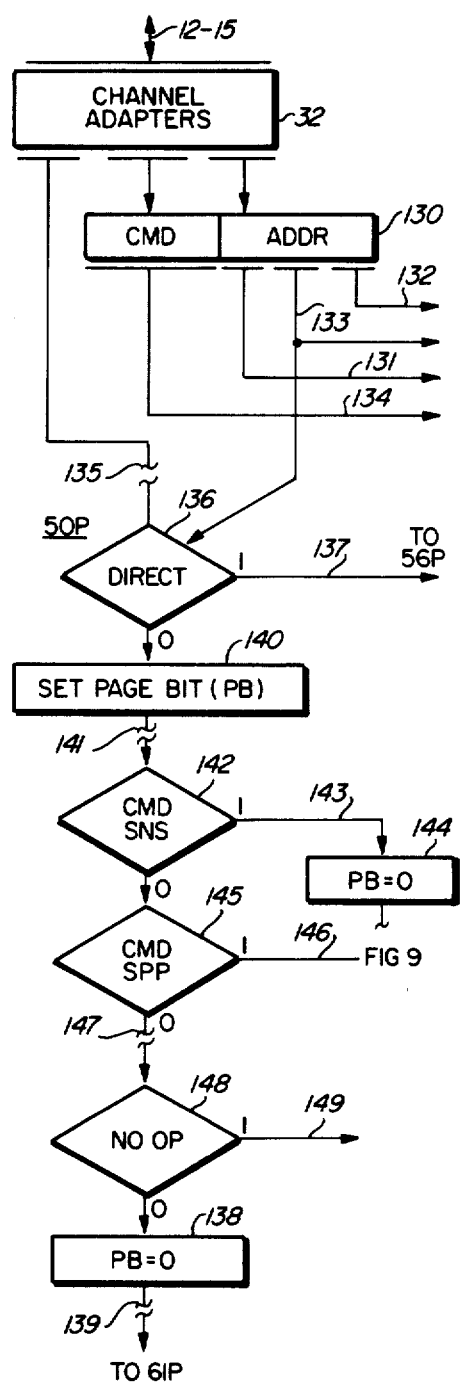
FIG. 6 is a combined logic and flow diagram showing the address and command evaluator of FIG. 3.

FIG. 6 is an abbreviated showing of ACE 50P together with the connection of channel circuits 32 illustrating how the present invention is practiced with respect to that portion of control 31. It is to be appreciated that other commands and functions are performed in ACE 50P which are not pertinent to an understanding of the present invention. Commands from host 11 are supplied over an I/O connection 12-15 to a channel adapter 32 which provides usual command preprocessing including supplying a command code permutation and a logical device code permutation to register 130. Bus 131 carries a portion of the address in register 130 identifying the control unit CU as explained with respect to FIG. 3. Bus 132 carries a DASD 16 address, i.e., address 23 of the total address field as DEV of item 20. Bus 133 carries the code permutation AC (item 20, FIG. 1) identifying whether or not direct access to the addressed DASD 16 is to be implemented or which of the logical devices is currently being addressed. Bus 134 carries a code permutation for the received command to control 31. In addition, channel adapters 32 provide interruption signals to processor 31P for activating microcode program ACE 50P. When activated by a channel adapter 32 interruption signal, processor 31P performs certain non-pertinent functions at 135 preparatory to processing the received command as it pertains to the present invention. At 136, the address portion AC is analyzed to determine whether or not direct access to DASDs 16 is desired or whether access to the devices will be via cache 40. For a direct mode access, logical path 137 is followed by processor 31P to DAC 56P. When DAC 56P is activated it is appreciated that the addressed DASD 16 becomes busy and is not available for transfer of data signals with cache 40. When the direct mode is not indicated at 136, then the paging mode, i.e., access to a device's 16 data via cache 40 is indicated. At logic step 140, a page bit (PB) of an internal register in processor 31P is set to the active condition. This bit is used only by ACE 50P for remembering that it is processing a command in a paging mode. Upon completion of ACE 50P operation, PB is erased. For this reason, the bit position of an internal register is not shown. Following step 140, some non-pertinent logic steps are performed at 141. At 142, whether or not the received command is a SENSE command (host 11 has requested so-called SENSE or status information from storage system 10) for the addressed logical device is determined. For a SENSE command, logical path 143 is followed to step 144 wherein PB is reset to zero, i.e., status information will be supplied to host 11 and further paging functions are not performed.

From step 142, for a non-SENSE type command, logic step 145 is performed. Preparatory to performing step 145, error check conditions are verified as being non-existent; certain internal housekeeping functions not necessary to the practice of the present invention, such as address setting and the like, are performed. Then, in step 145, ACE 50P detects the command SET PAGING PARAMETERS (SPP). For a detected set paging parameters command logic path 146 is followed to the steps set forth in FIG. 9. Otherwise, some other non-pertinent functions are performed at 147 followed by detection of a no-op (no operation) command 148. For a no-op command, logic path 149 is followed to functions not further described. At 138, PB is reset to zero which is followed by some non-pertinent functions at 139. Then, CAC 61P is activated as shown in FIG. 7.

Figure 7:
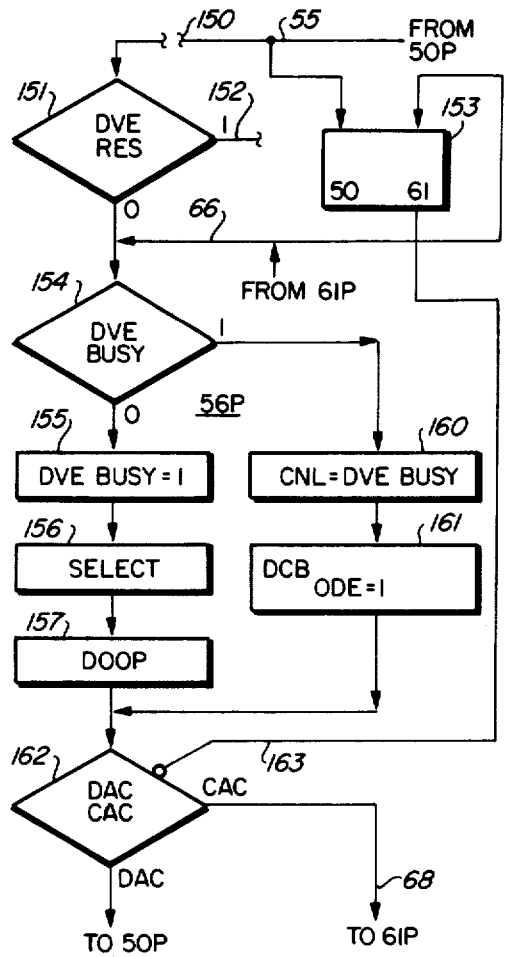
FIG. 7 is a logic flow diagram illustrating the direct access control of FIG. 3.

FIG. 7 illustrates the logic steps of DAC 56P necessary for an understanding of the present invention. Activation of 56P can be either from ACE 50P or CAC 61P. For direct access to DASDs 16, entry at 55 (see FIG. 1) from ACE 50 results in attempting to select the addressed DASD 16 at 150. Also flip-flop 153 (internal to processor 31P) is set to the conditions for indicating direct access mode (50) following steps 150, at 151 processor 31P determines whether or not the addressed device is reserved to a channel adapter 32 other than the channel adapter which received the command. If this is the case, logic path 152 leads processor 31P to the usual reserve violation code which indicates a busy status to the requesting channel adapter 32. If the device is not reserved to another channel adapter, then device selection continues within DAC 56P.

Requested access to a DASD 16 through DAC 56P can also occur from CAC 61P via logic path 66. Such a request results in flip-flop 153 being set at 61 for indicating that paging access is occurring. Since the request from CAC 61P comes over logic path 66, subsequent to the reserve evaluation step 151, device reserve has no effect on paging access to DASDs 16. From either step 151 or path 66, logic step 154 checks to see whether or not the DASD 16 addressed either by host 11 or by CAC 61P is busy, i.e., currently performing a data processing function or a free-standing function, such as radially locating a track. If the device is not busy, a device busy flip-flop (not shown) is set active at 155. Such flip-flop can be sensed by channel adapter 32 as well as processor 31P to see if the device is busy. At 156, the addressed DASD 16 selection is completed allowing data transfers to ensue. At 157, the operation is performed. That is, if the command from the control unit to the addressed DASD is to seek a cylinder, then step 157 results in transferring the SEEK CYLINDER command together with the target cylinder address to the addressed DASD 16; for READ command a read would be instituted with the signals being transferred from device 16-18 to host 11 over bus 70 (FIG. 4) or to cache 40 over bus 42.

On the other hand, if the addressed DASD is busy, then at 160 a device busy indication is transferred to the requesting channel adapter 32 or to CAC 61P. A device control block DCB (not shown) containing control data for operating with devices has an owed device end flag set to unity at 161. For a CAC 61P attempted access to DASDs 16, ODE 90 of the LDCB 62 (FIG. 5) is set to the active condition. At 162, the processor 31P determines whether or not the operation just performed is for a direct access or for a paging access. Flip-flop 153 supplies this indicating signal over line 163 such that when flip-flop 153 is in the 61 state, logic path 68 to 61P is followed while in the direct access mode (the 50 state); return to ACE 50P for reporting the status and terminating operations with the channel adapter 32 is instituted. Such status and terminating operations are those usually performed in connection with IBM computers and therefore are not further described.

FIG. 8 illustrates overall logic flow of system 10 operation. From ACE 50P, the paging mode is set at 170 as described later with respect to FIG. 9. Certain non-pertinent functions are performed at 171 with the completion of the paging mode being set reported through ACE 50P at 172. Then host 11 will send another command which is decoded at 173. Command execution is initiated at 174. A search of directory 43 is made at 175 to see if storage space in cache 40 has been allocated to the requested paging block. For a hit at 176, data transfer, either a read to host 11 or a write from host 11, is performed at 177. The addressed cache 40 area for the data transfer is then indicated as most recently used in the LRU list updating step 178. Then processor 31P returns to ACE 50P for reporting completion of the command. For a cache miss caused by a received READ command, a read request is made at 180 and a CCR (channel command retry) is sent to host 11 via ACE 50P at 181. For a WRITE command, a segment of cache 40 is allocated and then following logic path 182 data transfer 177 is performed. Note that a write to cache does not delay execution of a command except for an insignificant time required to allocate the space in cache 40. It is understood that steps 173 through 180 can be performed several times during each chain of commands but that the paging mode is set only once per a chain of commands.

Asynchronous data transfers from a DASD 16 to cache 40 require activation by processor 31P performing a well-known scan for work (idlescan). Following logic path 183, queue 69 is examined at 184. When the queue indicates a data transfer is to ensue, that job is then dispatched. Cache space is allocated at 185 and a chain of internal command words (ICW) is built at 186. An ICW is similar to a CCW received from host 11 through a channel adapter 32. Hence, the asynchronous data transfers between cache 40 and a DASD 16 are performed through DAC 56P. This means that the asynchronous operation is on the same level as the direct access operation, i.e., has the same priority as opposed to giving priority to the direct access request from host 11. The processing is turned over to DAC 56P at 187 for automatic transfer of data from a DASD 16 to cache 40. Upon completion of that transfer, processor 31P at 188 performs housekeeping functions for updating directory 43 and the like. At 189, the work is dequeued from queue 69. For a read operation a device end is sent to host 11 via ACE 50P. The SET PAGING PARAMETERS command from host 11 indicates to storage system 10 that in a subsequent chain of commands data transfers may ensue that use cache 40 to access a DASD 16 via one of the three logical addresses.

As shown in FIG. 9, activation of set paging parameters logic steps is via logic path 146. At step 190, CCB 63 is accessed for setting SPM 120 to unity, CC 121 to 0, and RR 122 to 0. This initializes CCB 63 for execution of the SET PAGING PARAMETERS command. Then at 191, CCB 63 is again accessed for setting CMD 123 equal to the code permutation representing SPP. At 192, CCB 63 is again accessed for transferring a channel mask to CNLMASK register 124 (FIG. 5). Then at 193, the LDCB 62 pointer is generated and transferred to LDCBP 126 of CCB 63. The LDCB 62 pointer consists of the base address of the LDCBs (LDCBB) as modified by the logical device address. Then, in LDCB 62 corresponding to the pointer generated in step 193, logical step 194 indicates that an SIO (start input/output) host selection signal has been received (this is not shown in FOUND 80), ODE 90 is reset to zero, CCR 95 is reset to zero, and SEQ 94 is set to the value received in the SET PAGING PARAMETERS command; that is, whether or not a sequential operation is to be performed as indicated in the SET PAGING PARAMETERS command. In a similar manner, read and discard, a paging parameter which is selected by the SET PAGING PARAMETERS command, is inserted into RO 101 of PPARMs 81. Some non-pertinent logic steps are performed at 195 by processor 31P; then at 196, LDCB 62 is examined at the logical address for determining whether or not sequential bit SEQ 94 has been set to the active condition. If not, ACE 50P is returned to for indicating that the SET PAGING PARAMETERS command has been executed. For sequential mode, the block count is set at 197 into B COUNT 102 of PPARMs 81. When the sequential bit is active, SET PAGING PARAMETERS command has a byte of modifier data indicating the number of blocks to be transferred in the current chain of commands. At 198, the block count is checked—if it is zero, an error has occurred, i.e., it is improper for host 11 to indicate a transfer of zero blocks. If it is non-zero, ACE 50P is returned to for reporting the successful completion of the SET PAGING PARAMETERS command.

Not only does ACE 50P decode commands but CAC 61P must also decode those commands relating to paging operations. FIG. 10 illustrates the logic associated with such decoding. Entry is from ACE 50P during a chained reselection for a paging mode logical address, CAC 61P decodes the command found in register 130 (FIG. 6) and initiates appropriate action. Error conditions are also reported. Several internal registers (IR) are used during execution of this module, these IRs are not shown for brevity in the drawing; the use of internal registers in microcode and other types of processors 31P functions is well known. Associated with the command in register 130 (FIG. 6) is the logical device address. For enhanced processing, selected portions of LDCB 62 are transferred to internal registers (not shown) of processor 31P. Then at 200, the channel mask from section 91 of foundation portion 80 and the logical address in section 92 are transferred to other internal registers (not shown) of processor 31P. The command from register 130 is transferred to the internal register (not shown) at 201. At 202, CCB 63 is accessed for comparing the logical address in register portion 125 (FIG. 5) with the logical address being received from register 130 (FIG. 6). If there is no change in addresses then steps 203 and 204 are omitted. Otherwise, CCB 63 is initialized at 203 for transferring all of the current control data from channel adapters 32 and register 130 into CCB 63.

A new pointer LDCBP to LDCB 62 is calculated at 204 as previously described and also transferred to CCB 63 section 126. At 205, the LDCB 62 SIO (start I/O) flag (not shown) is reset to zero. That is, we are now proceeding into command execution and the SIO is no longer considered recent. At 206, CCR bit 95 of foundation portion 80 of LDCB 62 is examined. If it is zero, some non-pertinent steps are performed at 207 and then at 208 the received command in register 130 and stored into the internal register at 201 is stored in LDCB 62, section 93. Certain flags, such as SEQ 100, RO 101 and the like, are transferred to an internal register (not shown) of processor 31P. Then the code module for executing the received command is activated at 209. That portion of the microcode, after completing the command, will return processor 31P to ACE 50P. These commands can include SET SECTOR, SEEK CYLINDER, READ, WRITE, and the like; the code module for such commands is known. If at 206 a channel command retry (CCR) was indicated, then at 212, processor 31P checks to see if the received command from channel adapter 32 corresponds to the command stored in section 93 of LDCB 62. If they are equal, everything is all right and the CCR bit 95 is reset to zero at 214. Then steps 208 and 209 are performed. If the commands are not equal, an error condition is indicated at 213 and ACE 50P is returned to immediately for reporting the error status to host 11.

Figure 13:
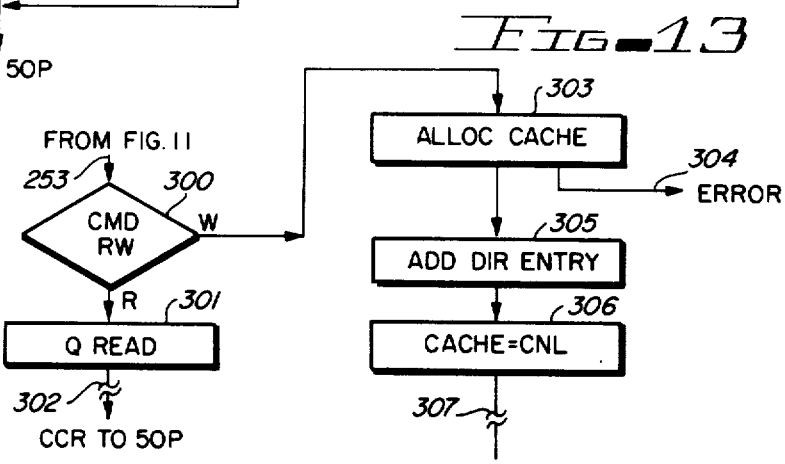
FIG. 13 shows a logic flow portion of the FIG. 8 cache access control relating to operations when access to a cache results in a so-called miss.

In a command execution, such as activated at step 209, one of the first things to be done is to search DIR 43 for allocated space in cache 40 corresponding to the requested paging block. FIG. 11 illustrates the logic steps which perform the control for both read and write data commands bearing a logical device address. DIR 43 is first searched; if the requested paging block is not in cache 40, a miss occurs. Then certain functions as shown in FIG. 13 are performed. On the other hand, if the requested paging block is identified as being in cache 40, then a so-called cache hit occurs with a resulting data transfer. Read or write command execution continues as will become apparent. In detail, at 221, certain non-pertinent logic steps are performed with respect to error status. For example, if the received command is not a read or a write command, then it is inappropriate that a directory search be made and an error condition has to be indicated. At 222, a block identification (BID) is built from the device address D, cylinder address C, head address H and the record R. In the instant embodiment, there are four records per track, hence the record number has any one of four values. Building BID merely constitutes taking the address and putting it into a two-byte internal register. At 223, hash 44 is executed. The hash, which can be any hash operation, generates an address signal corresponding to the address displacement into SIT 45 which contains the directory 43 index. That pointer is then fetched at 224 from SIT 45. Then in loop 205, DIR 43 is scanned within a hash class. When SIT 45 is read at 224, an entry from DIR 43 constituting the first entry in a hash class is read from subsystem storage 30 into internal register (not shown) of processor 31P. This frees system storage 30 for other operations in the event an interruption occurs. In any event, the directory search includes making ADEB 76 equal to the addressed directory entry at 227. This action includes reading the appropriate directory 43 entry and transferring the entry to ADEB 76. At 228 some non-pertinent logic steps are performed. At 229, the contents of BID are compared with address 108 contained in ADEB 76. If the two values are equal, then a hit occurs and logic path 230 is followed. If the two values are not equal, then directory 43 searching continues. LINK 109 is sent to an appropriate internal register (not shown) at 231. Then at 226, the link is examined to see if it is the end of the hash chain (EOC). If the entry is the last entry in the hash link chain, then a cache miss has occurred and a return code RC representing a cache miss is set at 233. Otherwise, the scan continues repeating steps 227 and 229 looking for a cache hit by transferring successive directory 43 entries into ADEB 76.

When a cache hit occurs at step 229 (BID=DIR), processor 31P at 240 compares the CCL of section 108 of ADEB 76 with the cylinder value C for inequality. If there is no record in cache 40 corresponding to the desired record, the return code RC is set at 241 to no record. For equality between CCL and C, a record found or hit is indicated at 242 and at 243 an internal register (not shown) is set equal to the INDEX 107 of ADEB 76 (FIG. 5). Logic path 234 is followed to perform some non-pertinent error-related functions at 250; then at 251, whether or not a cache miss is indicated, is examined. If a cache miss was not indicated (hit) then at 254 whether or not a record was found is examined, i.e., the return code of no record at 241 or a record found at 242. For no record, an error is indicated at 255 and processor 31P returns to ACE 50P for reporting the error condition. Otherwise, a record was found and the execution of the read command for transferring data from cache 40 to host 11 or in the reverse direction is performed as described later with respect to FIG. 12. On the other hand, for a cache miss condition at 251, processor 31P at 252, accesses LDCB 62 for the addressed logical device and sets the miss bit 96 to unity in the foundation portion 80 (FIG. 5). Then at 253, processor 31P prepares cache 40 for command execution as explained later with respect to FIG. 13.

Figure 12:
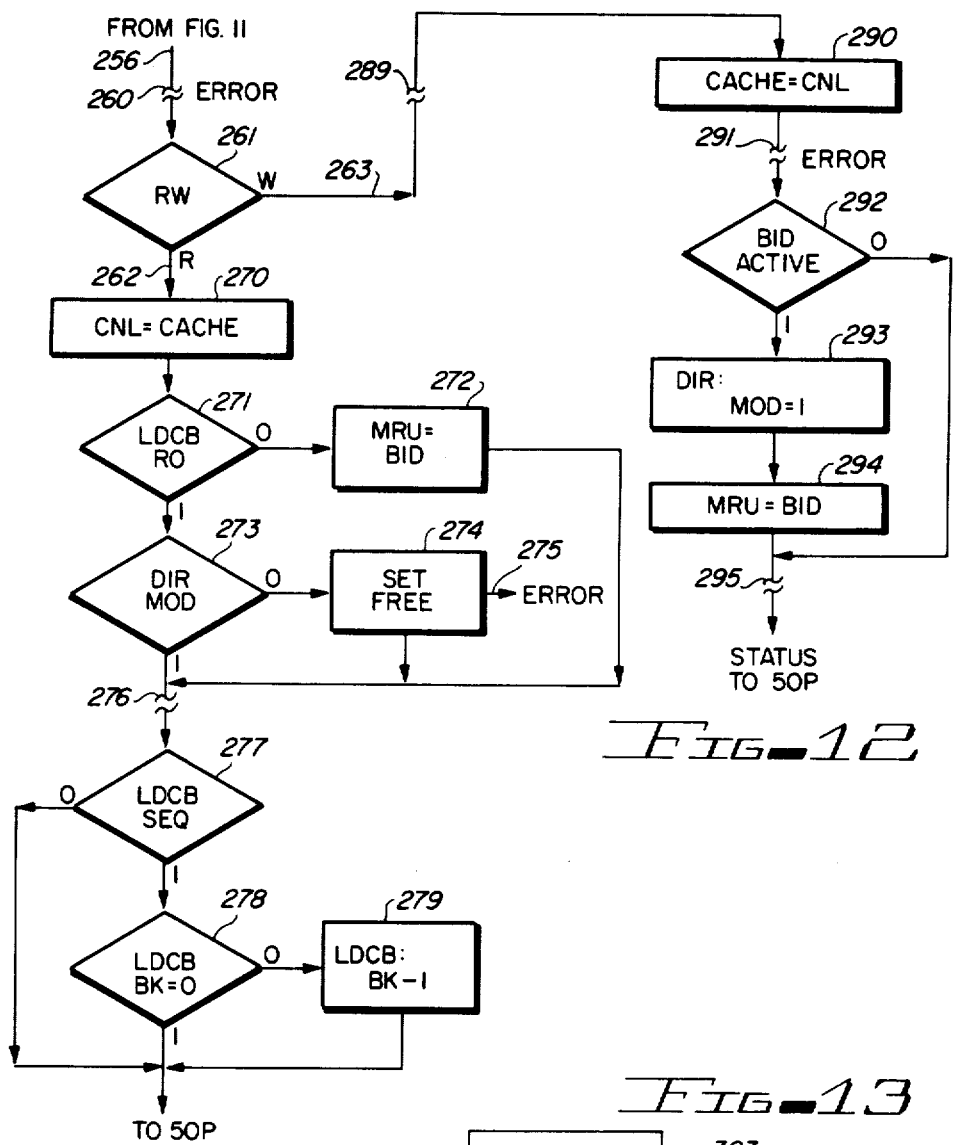
FIG. 12 illustrates machine operations with respect to read or write commands of the FIG. 8 illustrated cache access control.

For a cache 40 hit, for either a read or write command, the logic steps of FIG. 11 show processor 31P following logic path 256 to FIG. 12 to perform some error detection and indicating related non-pertinent logic steps at 260. At 261, the mode of read or write is examined. The mode check includes examining the command code permutation stored in section 93 of foundation portion 80 of LDCB 62. For a read command, logic path 262 is followed while for a write command, logic path 263 is followed.

For a read command hit, data is transferred from cache 40 to host 11. At 270 the transfer actually takes place by transferring data from cache 40 over bus 41 (FIG. 3) to channel adapters 32 for relaying to host 11. Upon completion of that data transfer, which can be achieved by an automatic data transfer circuit (not shown) of known design and widely practiced in the data processing art, control of storage system 10 returns to operate with respect to the present received command. It should be appreciated that control functions during cache miss processing may be interleaved with data transfer functions in the various channel adapters 32. In any event, at 271 processor 31P examines LDCB 62 bit RO 101. If RO is equal to zero, then there is no discard after read. The block identification (BID) is then set in a so-called least recently used list as the most recently used (MRU) cache segment at 272. Since LRU lists are well known they are not described. From step 272, processor 31P proceeds to later-described step 277. If RO 101 is equal to unity at 271, then processor 31P at 273 examines ADEB 76 bit M 269 to determine if the identified paging block in cache 40 is modified from the copy of data in DASD 16. M bit 269 is set whenever a write command is executed against cache 40 for a given record. If the directory 43 indicates there was no modification of the paging block stored in cache 40, the area of cache 40 storing a paging block is set free at 274 and the contents of ADEB 76 are erased as well as the corresponding entry in directory 43. This action effectively erases the paging block from cache 40. Certain error conditions are checked as indicated by logic path 275. Processor 31P continues to perform non-pertinent logic steps at 276.

Before a cache 40 portion storing a modified data block can be set free, that paging block has to be moved from cache 40 to the corresponding DASD 16. In one version of practicing the present invention, such modified paging blocks were transferred to a DASD 16 immediately following the last command in the chain of commands and before the chain was indicated as being completed. Included in the non-pertinent logic steps 276 is listing the paging block for possible transfer to the respective DASD 16 in a control block (not shown) used to direct destaging or demotion of data from the buffer to its backing store. Such mechanisms are well known and not described for that reason. Then at 277, processor 31P examines LDCB 62, SEQ 94 to see if sequential data is being processed. If not, only one block of paging data was sent to the host and the completion of the command can be reported by ACE 50P; otherwise, at logic step 278, processor 31P examines the block count indicated in section 102 of PPARMs 81 (FIG. 5). If the block count is not zero, then at 279 one is subtracted from the block count and the completion of the command is reported to host 11 through ACE 50P. Otherwise at 279 the block count is zero; then all of the sequential data has been transferred to host 11 and the completion of the command can be immediately indicated to host 11 through ACE 50P.

For a write command, from logic path 263, processor 31P first performs some non-pertinent functions at 289. Such non-pertinent functions include setting up an automatic data transfer circuit (not shown) for transferring data from host 11 through the appropriate channel adapter 32, thence to cache 40 via bus 41. This data transfer actually occurs at 290. During the data transfer, processor 31P can keep operating with other channel adapters 32 in the control function area. Also at the same time, a direct access to a DASD 16 can occur, including a transfer of data signals. That is, channel adapter CAA can be transferring signals between cache 40 and host 11 through I/O connection 12 simultaneously while channel adapter CAD is transferring data signals between host 11 input/output connection 15 and a DASD 16. Such overlap adds to the performance of storage system 10. Following the data transfer, processor 31P performs error-related functions at 291. Then at 292, if the block identification of the just-transferred data signals is active, this means the block is not pinned to cache, i.e., may be replaced. Then, at 293, M bit 269 is set to unity and at 294, the block identification is made most recently used in the LRU list (not shown). Then at 295, non-pertinent functions are performed. Finally, for reporting status on the write command, control of processor 31P returns to ACE 50P. If the block is pinned to cache 40 at 292, to avoid repeat of the error the write-to-cache is made to a newly allocated area of cache 40 and the error-related area of cache 40 is suitably marked.

For a cache miss in FIG. 11, processor 31P follows logic path 253 to the steps in FIG. 13. At step 300 processor 31P examines whether or not the command is a read or write. For a read command the read request is queued at 301, as described later with respect to FIG. 14 and as shown in FIG. 5. Then at 302, certain non-pertinent functions are performed and a channel command retry CCR is sent to host 11 via ACE 50P. The CCR asks the host 11 to resend the command after a so-called DEVICE END is sent by storage system 10 which indicates that the data is now in cache 40.

For a write command at step 300, processor 31P goes to step 303 for allocating a cache block for the upcoming write command. An error condition can be found with an error reported via logic path 304. At step 305 a new entry is added to directory 43 using the format set up as shown for ADEB 76 in FIG. 5. Then the actual data transfer occurs at 306 as the signals from host 11 are transferred to cache 40 over bus 41 via a channel adapter 32. Then at 307 in FIG. 13 steps 291-295 of FIG. 12 are performed.

The read queues are built as shown in FIG. 14 wherein processor 31P at 310 accesses CCB 63 to set the contents of an internal register equal to the contents of LDADDR 125. At 311 the LDADDR is converted to a physical device address DADDR by deleting the AC portion. At 312 the read queue corresponding to the device (QX) is set equal to unity, i.e., the portion 86 (FIG. 5) corresponding to the logical device is set to unity. This single bit is then translated into LDCB 62 addresses; the base address of the LDCB is known with the offset being the logical address. Since the position of the portion in LDCB 62 is the logical address, the LDCB offset is also known. Then at 314, processor 31P determines whether or not portion 87 (FIG. 5) is zero, i.e., there are no reads queued. If the portion 87 is empty, then at 320 the pointer for the read queue is set to the logical device; that is, 1, 2 or 3 depending upon which logical device is in LDADDR. At 321 LDCB 62 is accessed with read retry RR bit 122 and RWR 128 are set to unity. If there is a read queue entry in section 86, i.e., a read queue has already been inserted, then at 315 the queue pointer is indexed by 1. At 316 the queue pointer is checked again. If the pointer is less than 3, then processor 31P follows logic path 318 processor 31P to again examine the next position in portion 86 to determine if that one is empty. If it is not empty, then the cycle is repeated until either an empty queue location is found or an error condition is indicated at 317 showing a read queue request when the read queue is full (i.e., pointer is equal to 3).

FIG. 15 illustrates the logic flow in both storage directors 17 for sending and receiving proxy work for effecting load balancing and enhancing performance of data storage hierarchy 10. For ease of reference since the logic is identical in both storage directors, the same numerals indicate corresponding logic portions in the two storage directors. In the description, storage director 17A is the director that is work requesting while storage director 17B is the work sending storage director responding to the request for proxy work. The formats of the messages exchanged between directors 17A and 17B are shown as three types, it being understood that additional messages may be employed particularly for requesting status, i.e., work sending storage director 17B may want to request status of the proxy work being performed by work requesting storage director 17A.

First, the message formats are described for giving an overview of the proxy-related machine operations. Each proxy operation is initiated by a proxy request message which includes a proxy identification, ID 385, preferably such identification will include which storage director 17 has sent the initial request plus a serial number of the request. In this manner, host 11 can periodically make inquiries of the storage directors to evaluate how well the work loads are balanced between the storage directors, simply by comparing the highest serial numbers in the respective storage directors 17. Because of cache 40 status (amount of free space is minimal), requesting storage director 17A may indicate a preference for a proxy write by setting PW bit 386 to unity. In a similar manner, setting PR bit 387 to unity indicates a preference for a proxy read operation (cache 40 has a maximum of free space). PA bit 388 signifies that any form of proxy operation is satisfactory (cache 40 free space is a predetermined average value). Status request bit SR 389 can be used by the responding storage director 17B for asking requesting storage director 17A the status of proxy work associated with ID 385. The logic of requesting and supplying status is not detailed since status reporting is well known.

The proxy response message supplied by responding storage director 17B to requesting storage director 17A includes ID 375 which has a code permutation equal to ID 385 such that the requesting storage director can tie the response into the request. PSV 376 contains a set of bits signifying the state vector of responding or work sending storage director 17B. This can include that no proxy work is available, etc. Flags (FLG) 377 include miscellaneous informational bits such as identification of the process in host 11 for which the proxy work is to be performed, priority status of the proxy work, and the like. Proxy flags (FLG) 378 indicate the character of the proxy response, i.e., read, write, and so forth. The proxy stage parameters (PARMs) 379 include the information contained in proxy queue 84 fields 352 and 353 for a read operation while proxy destage PARMs 380 contain the same information for a destage proxy. A proxy operation status 381 is used in response to a status request in a proxy request message for indicating the current status of the proxy operation. Since status reporting is not detailed, this field will not be further explained. Numeral 382 indicates that additional fields may be added to the proxy response message. Proxy status message is supplied upon completion of a proxy operation by the requesting storage director 17A. The status message includes the identification 390 which has the same code permutation as the proxy request and response messages. Return code 391 indicates whether or not an error-free proxy operation occurred. In the event an error occurred, then RC 391 is non-zero with additional error parameters being supplied indicated by ellipsis 392. Further, for a proxy read operation, ending status for host 11 is supplied within the proxy status message. Such ending status is dependent upon the architecture of host 11 and is dispensed with for that reason. The sequence of machine operations shown in FIG. 15 begins with the so-called idle loop of processor 31P. The idle loop at 400 looks for assigned work functions, such work functions including data transfer, command execution, checking for channel command retry, and the like, are well known and not described further for that reason. The idle scan of assigned work functions may find no assigned work to be done. Then requesting storage director 17A follows logic path 401 to step 402. At 402 requesting storage director 17A examines its asynchronous work level by testing queues 69. If queues 69 indicate a relatively high work level, then logic path 408 returns to assigned work functions 400 for scanning queues 69 to do the work indicated therein. As an example, read queue RQ may have two thresholds 404 and 405. Threshold 404 is a lower threshold for performing reads that are not immediately associated with an outstanding or present host 11 request. Threshold 405 indicates an excessive number of reads that have to be performed by requesting storage director 17A. With the read queue that long, no proxy work can be requested. In one embodiment threshold 404 equals no outstanding read requests. In a similar manner, WQ has a threshold 406. Threshold 406 can be selected in a manner for batching or grouping write requirements for more efficiently accessing DASD 16. In any event, the contents of RQ and WQ of queues 69 are considered in evaluating the work level as indicated by the pair of lines 407. When RQ and WQ have a relatively low work level (a level of zero is used in the preferred embodiment) then a proxy work request is sent to the work sending or responding storage director 17B. First a timeout 410 is set (such as two seconds) in which the responding storage director 17 can respond to the immediate proxy work request. In formulating the proxy request message at 411 PIDK 363 (FIG. 5) is first incremented and then the contents of fields 363 and 364 are formed as ID 385 and stored in ID 361 of proxy queue 84. The request being formulated at 411 receives an input from LRU (not shown) 412 which indicates the allocatable and free space available in cache 40. Based upon the allocatable space available as indicated by the LRU using known techniques of LRU list (least recently used replacement control list) either a proxy write or a proxy read as respectively indicated by bits PW 386 and PR 387 may be requested to the responding storage director 17B. Since the LRU affects the operation of both storage directors 17 because of cache 40 data contents, the least busy storage director 17 has an additional input to space management of cache 40. For example, if the allocatable cache data storage space available is relatively small, then a proxy write would be requested for increasing the allocatable space in cache 40. On the other hand, if a major portion of cache 40 was allocatable, then a proxy read is requested for enhancing performance of data storage hierarchy with respect to host 11. When the allocatable space indicated by LRU 412 is intermediate the two thresholds of allocatable space, then PA 388 indicates that the responding storage director 17B can select which type of proxy operation is to be sent to the requesting storage director 17A.

The proxy request being built at 411 is then supplied through message RAM 18 over data bus 340 after suitably setting up parameter data exchange through tag lines 342 to responding storage director 17B. Responding storage director 17B will have idle time between interleaved machine operations such that the proxy request message supplied by requesting storage director 17A can be processed. At 422 responding storage director 17B examines its work status including examining its queues 69 for the respective lengths; the examination can include examination of the allocatable or free space of cache 40 even though the requesting storage director 17A had previously considered same. If the work status at 422 was relatively low as can be arbitrarily or otherwise defined, for efficiency purposes, it is better not to allow proxy work to proceed. Accordingly, the responding storage director 17B at 425 holds its own work rather than sending out the work. In the proxy response message, PSV 376 will indicate that no work will be sent because the PSV state vector indicates a relatively low work status. Such threshold corresponds favorably to thresholds 404 and 406 of queues 69. On the other hand, responding storage director 17B may find at 422 that its work level is relatively high, i.e., above threshold 406 or above threshold 405 for example. In that case the proxy work will be selected and sent as indicated by machine operations step SEND 426. Machine operations step 426 includes selecting a data transfer operation from RQ or WQ and inserting the control parameters therewith within the proxy response message being sent to the requesting storage director 17A as previously described. Once the messages either HOLD or SEND are respectively generated at 425 and 426, the responding storage director 17B at 427 transfers the proxy response message through message RAM 18 to requesting storage director 17A. Additionally, the responding storage director may employ the entries PWI, PWO, PRI and PRO of queue registers 69 (FIG. 5) as an operation interlock for preventing duplicating the proxy work sent to the requesting storage director.

The proxy work being transferred is handled by requesting storage director 17A by transferring the proxy response message to proxy queue 84 as an assigned work function. Then, as described elsewhere in this description, the requested data transfer is set up and performed by the requesting storage director 17A as if it were work assigned by host 11. It is to be understood that while executing the proxy work other work may be received from host 11 and interleaved with the proxy work.

Upon completion of the data transfer between cache 40 and the DASD 16 requested in the proxy response message, the requesting storage director 17A supplies the proxy status message as indicated by logic path 432 extending from assigned work function to the proxy status step 433. Assembling the proxy status message is the same as a storage director assembling ending status for reporting a completed machine operation to a host 11. Since that procedure is well known, it is not detailed, it being sufficient to say that the return code RC 391 is zero for an error-free status and non-zero for an error occurring during the proxy data transfer. The proxy status message is transmitted to the responding storage director 17B as indicated by line 434 causing an assigned work function 400 to do so-called post processing of the proxy work for updating the records in the responding storage director 17B. Such action may include sending a DEVICE END to host 11 after a proxy read data transfer for indicating to host 11 that the data requested is now in cache 40 and ready to be transmitted to host 11 as if the responding storage director 17B in fact had staged the requested data from DASD 16 to cache 40.

The proxy queue within the requesting storage director 17A is updated as follows. When a request 411 is sent, QS 354 is set to the active condition. Similarly, assigned work function 400 updates CPS 357 or CPD 358 upon completion of the work. An error condition is indicated in PE 359 by the assigned work function 400. Upon sending the proxy status message at 433 to the responding storage director 17B, the requesting storage director 17A erases the contents of the proxy queue 84 as well as erasing any other proxy indicating bits associated with the ID 361 contained within the storage director. Responding storage director 17B updates its records in a similar manner.

Figure 16:
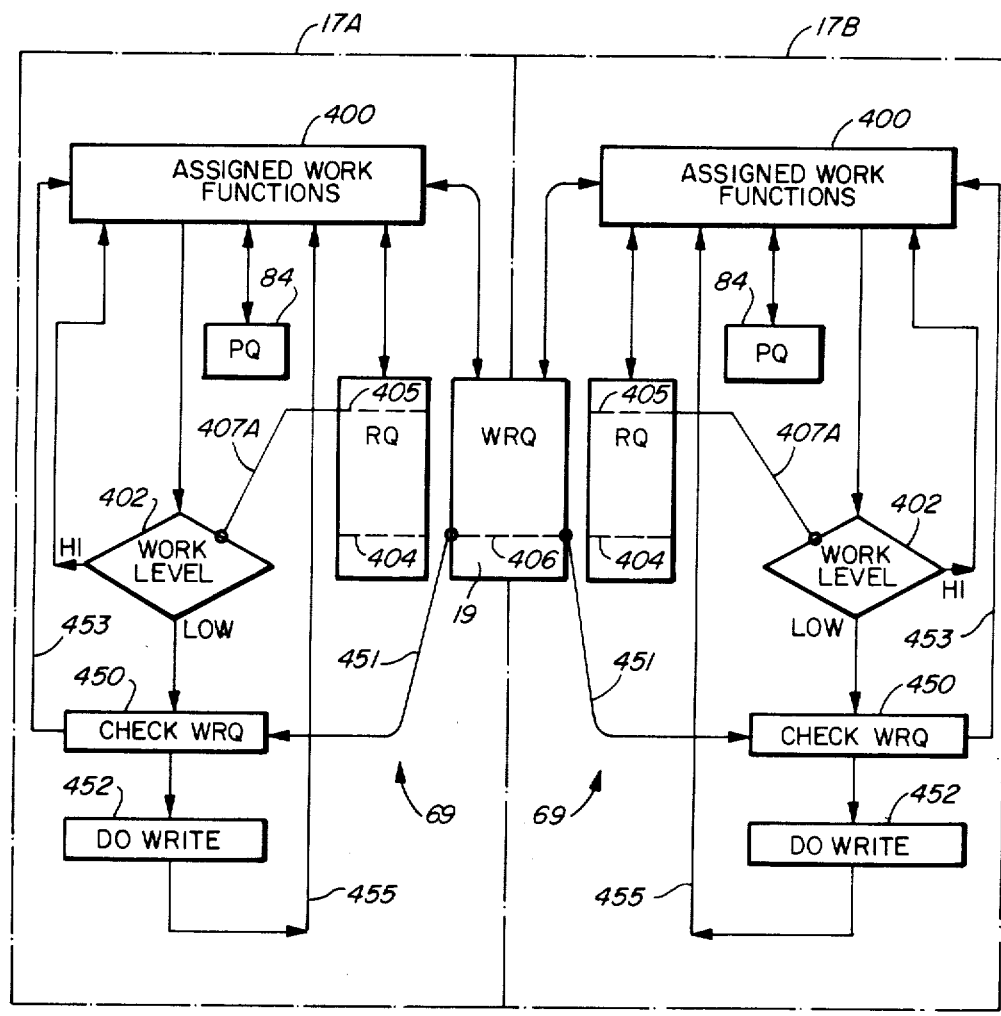

FIG. 16 shows an alternate method of proxy control particularly for writing data from cache 40 to a DASD 16 (destage). Numerals in FIG. 16 correspond favorably to those in FIG. 15. The work level step 402 in the requesting storage director 17A is affected primarily by the read queue RQ, no limitation thereto intended. If the read queue work level is low, then WRQ 19 is checked at 450. If WRQ 19 has a number of entries above threshold 406, as indicated by line 451, then a write to DASD 16 is performed at 452. By having a non-zero threshold 406 various records can be grouped for more efficiently transferring data from cache 40 to DASD 16. In the event WRQ 19 has no entries (threshold 406 can be made zero) then the requesting storage director 17A follows path 453 to scan for additional work to be done. Otherwise, at 452 path 455 is followed to the assigned work function for a host processing operation. As referred to earlier with respect to FIG. 15, with a shared write queue WRQ 19 any writes are handled as local operations with the shared data base in WRQ 19 and in the directory 43 providing the communications between the two storage directors 17 for purposes of synchronization and data integrity. For a read queue proxy operation, the procedure set forth in FIG. 15 is still followed for the alternate embodiment.

Figure 17:
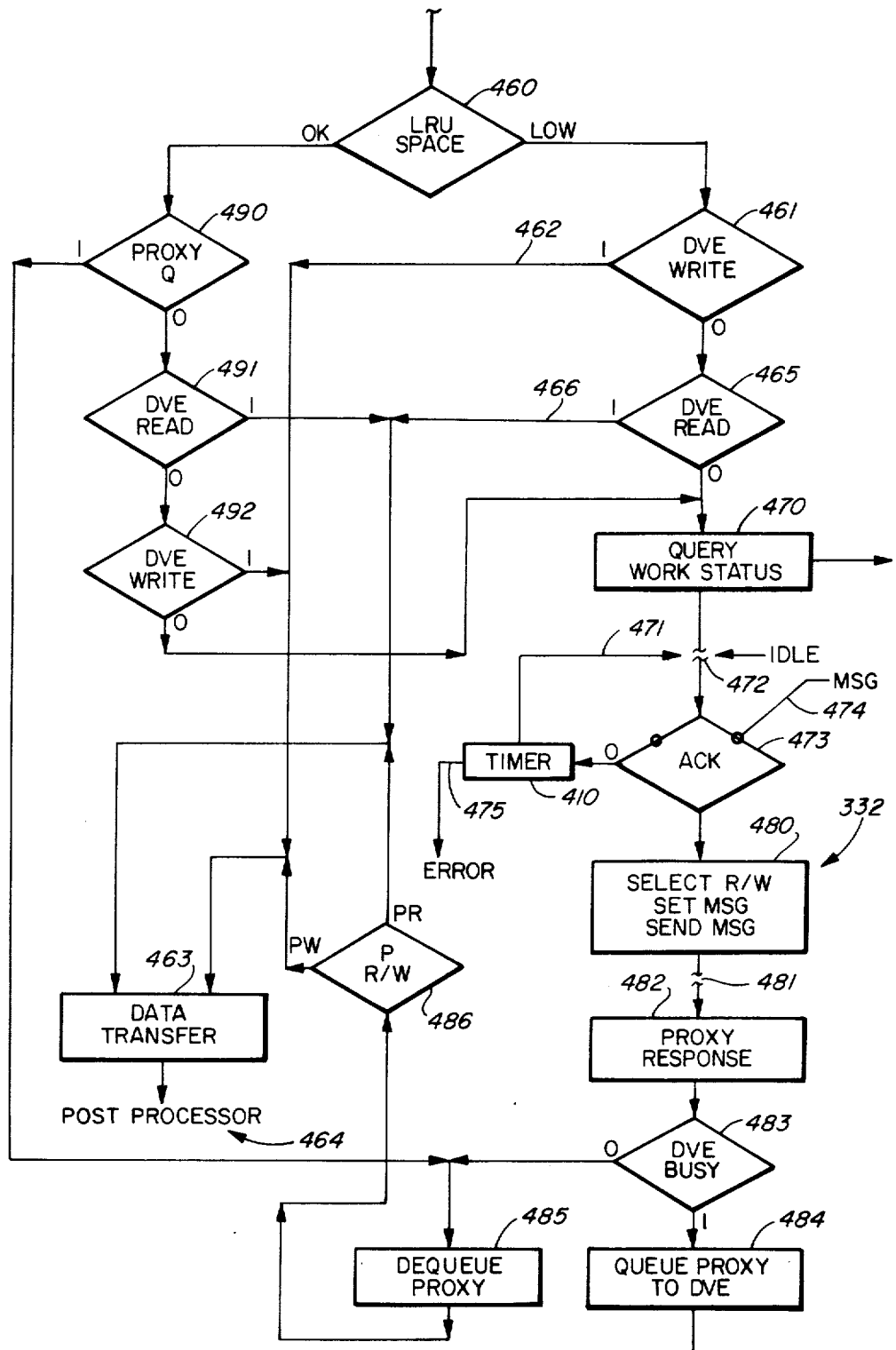

FIG. 17 is a machine operations chart showing a detailed machine operations corresponding to the flowchart of FIG. 2. As a part of the idle scan routine, storage director 17 at 460 examines the least recently used (LRU) list to determine the amount of allocatable space available in cache 40. It is known that LRUs are listed in order of recent usage and generally have an indicator showing whether or not the corresponding cache 40 allocatable data storage space is available for allocation. Generally, the data storage space is available for allocation when the listing in the LRU is below a given threshold and when the content of the cache in the data storage area is identical to the copy of the data in the DASD 16. In any event, if the amount of allocatable data storage space in cache 40 at step 460 is low, i.e., below a given threshold, then at 461 the storage director 17 examines WQ portion of queue 69. This is done first such that destaging or write operations to DASD 16 can occur for increasing the amount of allocatable data storage space. Accordingly, storage director 17 follows logic path 462 to data transfer step 463, detailed elsewhere in this description, for transferring a copy of data stored in cache 40 as identified by the entries in WQ of queue 69 to DASD. Following data transfer 463, storage director 17 proceeds to post processing at 464, such as shown in FIG. 18.

When WQ of queue 69 has no entries, storage director 17 at 465 examines RQ portions of queue 69. This secondary priority asynchronous data transfer operation results in a data transfer from DASD 16 to cache 40. Storage director 17 follows logic path 466 to data transfer step 463. In the event both the RQ and WQ portions of queue 69 are empty, then above-described proxy operation is initiated at 470. The work status query is supplied to the responding storage director 17B as above described at the same time as indicated by arrow 471. A timer is set such that when it times out, such as after 2 or 3 seconds, an error is indicated via logic path 475. After the work status query is made at 470, the requesting storage director 17A goes into its idle loop where it may receive additional commands from host 11 or receive attention signals from any of the DASDs 16. Such attention signals are well known and not described for that reason. At 472 other assigned work may be performed even before the responding storage director 17B responds to the proxy work request message. The responding storage director 17B supplies its proxy response message, indicated by line 474, which enables the acknowledgement step 473 to proceed to steps 480, et seq., as indicated by numeral 332. Until the message has been received from the responding storage director 17B, the requesting storage director 17A keeps timer 410 active by the idle loop indicated by numeral 472 and continues to look for work to be done or to service DASDs 16.

When the requesting storage director 17A has received the proxy response message, at 480 it selects whether a read or write data transfer is to be performed. At 473, it acknowledges through a message (not shown)

that the message in fact has been received. This acknowledgement can simply be activating a tag line within the tag lines 342 extending to the responding storage director 17B via message RAM 18. Step 480 corresponds to sending the proxy request message as indicated in FIG. 15 at 411. Then at 481 the requesting storage director 17A returns to its idle loop looking for DASDs needing service and for receiving commands from host 11. The proxy response message is then received at 482, corresponding to step 427 of FIG. 15. Then at 483, the requesting storage director 17A examines the status of the DASD 16 to be addressed. If the DASD is busy (DVE BUSY) then the proxy requested data transfer is queued to the device either in RQ or WQ, as shown in FIG. 5, along with the proxy bit. It should be noted that the contents of proxy queue 84 remain unchanged. As soon as the addressed DASD 16 becomes free for access, then the requesting storage director 17A examines the queue and initiates the data transfer at step 463 using known data accessing techniques. If the addressed DASD 16 is not busy at 483, then at 485 the device queue is removed from WQ 85 or RQ 86. At 486 the requesting storage director 17A examines whether the proxy is a read or write operation by examining bits 350 and 351. For a proxy read (PR) a read data transfer is initiated at 463. For a proxy write (PW) a write data transfer operation is initiated at 463.

In FIG. 18, post processing following the data transfer at 463 of FIG. 19 by the requesting storage director 17A finds by examination at 500 whether or not the just completed data transfer is a proxy data transfer. If not, the usual host processing operations are performed at 501 from which the requesting storage director 17A proceeds to idle scan. For a proxy data transfer at 463, the requesting storage director 17A at 502 updates directory 43. Since the directory 43 is common to both the responding and requesting storage directors 17, the storage director which is least busy has taken care of the so-called housekeeping on behalf of the responding or busier storage director. Then at 503, the requesting storage director 17A examines whether or not a read or write operation has just occurred. This examination affects the type of information supplied to the responding storage director 17B. For a write operation, which is completely independent of the host 11, status is built at 504. Such status is supplied to the responding storage director 17 via the proxy status message shown in FIG. 15. For a read operation, at 505 the requesting storage director 17A builds ending status for the responding storage director 17B and forwards the status as a part of the proxy status message. Then following step 504 or 505, step 506 actually sends the status message via message RAM 18. Proxy queue 84 is reset to zero enabling a new proxy operation to ensue. Then at 507 idle scan is returned to. FIG. 19 shows the operation of the responding storage director 17B. It will not respond to the message until it has reached an idle scan portion of its operations, i.e., the response to a proxy request is interleaved among other data processing operations. After having received the request at 510, the responding storage director 17B at 511 examines the LRU space, i.e., does cache 40 have a lot of allocatable space available or not? For a low amount of allocatable data storage space in cache 40, the responding storage director 17B at 512 first examines the write queue WQ 85. If the queue is equal to zero, i.e., has no entries, then read queue RQ 86 is examined at 513. For either RQ 86 or WQ 85 having entries (are not all zeroes) the work is assigned to the requesting storage director 17A at step 514. Step 514 corresponds to the FIG. 15 response 427 following the work status analysis of step 422 and is omitted from FIG. 19 for purposes of brevity. Then idle scan is returned at 515 for performing assigned work within the busier storage director 17. If the LRU space at 511 appears to be satisfactory, then it is desired to transfer data from DASD 16 into cache 40 for enhancing performance of the data storage hierarchy 10. Accordingly, at 516 RQ 86 is first examined, if RQ 86 does have some entries, then the queued reads are supplied as proxy work to the requesting storage director 17A at 514. If RQ 86 is empty at 516, then WQ 85 is examined at 512 following the above-described sequence of steps. In this instance, RQ 85 may be examined twice. When both RQ 86 and WQ 85 are empty, then at 517 the responding storage director 17B supplies a no work indication in the proxy response message of FIG. 15 by indicating in PSV 376 the code, arbitrarily selected as 43, that no work is available to be transmitted for proxy purposes.

As shown in the proxy request message of FIG. 15, the requesting storage director 17A can request either a read or write operation. In that instance, from step 510 for a write proxy request, the responding storage director 17B follows logic path 520 directly to the step 512, omitting the LRU space analysis step 511. On the other hand, if a read request was submitted with the proxy request message, then the responding storage director 17B follows logic path 521 directly to step 516 for first examining RQ 86 and again omitting the step 511. Accordingly, even though the requesting storage director 17A can indicate a preference for a read or write proxy operation, the responding storage director 17B has the facility for substituting another data processing operation for the requested one. When the situation is most appropriate in this instance, the coaction between the two storage directors 17 provides for enhanced operation with a minimal control.

While the invention has been particularly shown and described with reference to preferred embodiments thereof, changes in form and details may be made therein without departing from the spirit and scope of the invention.

What is claimed is:

1. A load-balancing control apparatus for balancing asynchronous activity in a multiunit system, including transferring data signals between any one of a first plurality of first units and a second unit via any one of a second plurality of transfer path means, comprising:

means for maintaining a queue of work to be done that relates to said data transfers for each of said transfer path means;

means responsive to each said path means, respectively, for sensing the level of work to be done within said queue, determining the volume of work for said path means, and indicating a low volume of work for said path means;

requesting means responsive to each of said path means and with said low-volume indicating means for sending a proxy request message which requests the transferring of a proxy work job related to said data transfers to a second of said path means from a first of said path means;

responding means in said second path means coupled to said requesting means for supplying the proxy work job related to said data transfer thereto; and operation control means in said first path means and coupled to said responding means, to said first units and to said second unit for performing said proxy work job received from said second path means and further having means for performing such operations independently of said proxy work job to effectively balance workload among the plurality of transfer path means in said multiunit system.

2. In a load-balancing control apparatus as set forth in claim 1 wherein each of said path means is a storage director, and said first units are data storage devices (DASD) and said second unit is a data storage cache; each of said storage directors including means for receiving requests from an external source for accessing said DASD and having means for servicing such received requests including means for interleaving operations relating to said asynchronous activity with operations synchronous to the operation of said external source further comprising:
- means in the storage director which is said second path means for indicating work status thereof and being coupled to said responding means for indicating thereto the level of work in said second path means; and
- means in said responding means for receiving said work status indication for preventing transferring said proxy work job when said work status indication indicates a predetermined low work level whereby load-balancing by proxy work transfers are limited to storage directors having a predetermined work level.

3. A load-balancing control apparatus as set forth in claim 2 wherein the queue maintaining means further includes a read queue in each of said storage directors for indicating those asynchronous activity items relating to transferring data from said DASD to said cache and a write queue in each of said storage directors for indicating those asynchronous activity items relating to transferring data from said cache to said DASD; and
- means in each of said storage directors coupled to said queues being a part of said work status means for indicating the level of work to be done by each of said coupled queues whereby the total work in each respective storage director is indicated via said queues.

4. A load-balancing control apparatus as set forth in claim 2, wherein the queue maintaining means further includes a write queue common to all of said storage directors and a read queue in each of said storage directors which is independent of all other read queues;
- means in said requesting means coupled to said common write queue for initiating asynchronous write activity for all of the storage directors directly from said common write queue and said low-volume indicating means operative only with respect to and being coupled to said independent read queues, respectively; and
- means in said requesting means coupled to said common write queue means and to sai low-volume means for selecting a priority of operation therebetween.

5. In a machine-implemented method of operating a plurality of programmable units, each programmable unit having a plurality of asynchronous work-performing portions, message means coupling all of said programmable units for enabling communications therebetween, said asynchronous work performing portions performing similar work such that asynchronous work of a first programmable unit can be performed by a second of said programmable units;

the improvement including the steps of:
- in each said programmable units maintaining a work queue for scheduling work to be done in the respective asynchronous portion of said programmable units;
- sensing said work queue in said first programmable unit for determining whether or not a light load condition prevails; if no such light load condition prevails, continuing to operate said asynchronous portion independent of said second programmable unit;
- upon sensing said relatively light load condition, sending a message to said second programmable unit via said message means requesting that work on said work queue of said second unit be transferred to said first programmable unit;
- in said second programmable unit, responding to said message, examining its said work queue and if a given work level exists, sending an identification of predetermined work via said message means to said first programmable unit;
- performing said predetermined work in said first programmable unit as if such predetermined work was being done by said second programmable unit; and
- upon completion of said predetermined work by said first programmable unit, in said first programmable unit sending a completion message to said second programmable unit and in said second programmable unit post processing said predetermined work as if completed within said second programmable unit.

6. In the machine-implemented method set forth in claim 5 including least recently used means coupled to all of said programmable units for indicating status of a first shared data storage unit used in connection with all of said asynchronous portions;

further including the steps of:
- in said first programmable unit, before sending completion message, accessing said least recently used means and updating same to reflect the status of said shared data storage unit after completion of said predetermined work; and
- sending said completion message in a first form when a first predetermined work type was performed and in a second form when a second predetermined work type was performed for said predetermined work.

7. The machine-implemented method according to claim 6 wherein said predetermined work of a first type is the step of transferring data signals from said first data storage unit to an addressed one of a plurality of second data storage units, said predetermined work of a second type comprises the step of transferring data signals from said addressed one of said second data storage units to said first data storage unit and
- sending said completion message from said first programmable unit for said second type of predetermined work to said second programmable unit in a form for enabling said second programmable unit to continue further processing of such transfer data signals from said first data storage unit and sending said completion message for said first type of predetermined work only for erasing same from its respective work queue.

8. A data processing system having a plurality of intercoupled programmable units having a work queue for queuing and performing a number of predetermined data processing operations such that any one of said programmable units can perform any one of said queued data processing operations, each of said programmable units having a data storage unit for storing electrically sensible indicia representing programs of instructions executable by the respective programmable units by sensing said stored electrical signals, respectively, for performing said queued data processing operations, further comprising:

first program indicia means in the data storage unit of each of said programmable units for enabling each programmable unit to scan for said work queue and initiate execution of said queued data processing operations;

second program indicia means in the data storage unit in each of said programmable units for enabling each programmable unit to measure the level of work to be done within the work queue and indicate its load condition including indicating a light load condition;

third program indicia means in the data storage unit of each of said programmable units for enabling a first programmable unit to generate and send to a second of said programmable units a message requesting a proxy assignment of one of said data processing operations queued in said second programmable unit and whereby such programmable unit sending said message being a light load programmable unit;

fourth program indicia means in the data storage unit of each of said programmable units for enabling each programmable unit to receive and respond as said second programmable unit to a message recieved from said light load programmable unit requesting said proxy assignment of said one queued data processing operation;

fifth program indicia means in the data storage unit of each of said programmable units for enabling each programmable unit as said second programmable unit to select a given one of its queued data processing operations for performance by said light load programmable unit such that said fourth program indicia enablement of such second programmable unit transfers to said light load programmable unit as proxy work such selected queud data processing operation;

sixth program indicia means in he data storage unit of each of said programmable units for enabling each programmable unit to receive only after sending as a light load programmable unit a proxy request message to said second programmable unit any selected queued data processing operation supplied by said second programmable unit as enabled by said fourth program indicia of said second programmable unit;

other program indicia means in said data storage unit of light load programmable unit for enabling said light load programmable unit to perform the data processing operation received from said second programmable unit; and seventh program indicia means in each of said programmable units for enabling said light load programmable unit to report completion of said selected queued data processing operation to said second programmable unit whereby any of said programmable units can at different times by said second or said light load programmable unit such that queued data processing operations are transferred to said light load programmable unit at the request of such light load programmable unit.

* * * * *